(12) United States Patent
Xie et al.

(10) Patent No.: US 11,848,698 B2
(45) Date of Patent: Dec. 19, 2023

(54) PATH PROTECTION METHOD AND NETWORK NODE

(71) Applicant: HUAWEI TECHNOLOGIES CO., LTD., Shenzhen (CN)

(72) Inventors: Gang Xie, Wuhan (CN); Hao Li, Wuhan (CN); Xianlong Luo, Dongguan (CN); Min Zhao, Shenzhen (CN); Haomian Zheng, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 60 days.

(21) Appl. No.: 17/733,199

(22) Filed: Apr. 29, 2022

(65) Prior Publication Data

US 2022/0263571 A1    Aug. 18, 2022

Related U.S. Application Data

(63) Continuation of application No. PCT/CN2020/125477, filed on Oct. 30, 2020.

(30) Foreign Application Priority Data

Nov. 1, 2019 (CN) .......................... 201911059334.5

(51) Int. Cl.
*H04B 10/032* (2013.01)
*H04B 10/038* (2013.01)
*H04J 14/02* (2006.01)

(52) U.S. Cl.
CPC ......... *H04B 10/032* (2013.01); *H04B 10/038* (2013.01); *H04J 14/0287* (2013.01)

(58) Field of Classification Search
CPC ............. H04B 10/03–032; H04J 14/0287–029
(Continued)

(56) References Cited

U.S. PATENT DOCUMENTS 9,002,194 B2 * 4/2015 Xia ...................... H04J 14/0298
                                                                398/58
2003/0120983 A1 * 6/2003 Vieregge ................. H04L 45/28
                                                                714/708
(Continued)

FOREIGN PATENT DOCUMENTS

CN          1269653 A     10/2000
CN        101309525 A     11/2008
(Continued)

OTHER PUBLICATIONS

Han Li et al., "Study on ASON Survivability Strategy", Jun. 30, 2012, total:63pages.

(Continued)

*Primary Examiner* — Li Liu
(74) *Attorney, Agent, or Firm* — HAUPTMAN HAM, LLP

(57) ABSTRACT

A path protection method includes receiving, by a source node of a first path, a path event notify message from a first node on the first path. The path event notify message includes indication information that the first path is predicted to fail. The path protection method further includes obtaining, by the source node, information about a predicted protection path. The information about the predicted protection path includes resource information of a second path useable to protect a service on the first path. The first path and the second path include the source node and a same sink node. The path protection method further includes storing, by the source node, the resource information of the second path.

18 Claims, 17 Drawing Sheets

(58) Field of Classification Search
USPC .......................................................... 398/1–8
See application file for complete search history.

(56) References Cited

U.S. PATENT DOCUMENTS

| | | | | |
|---|---|---|---|---|
| 2011/0126041 | A1* | 5/2011 | Matsubara | H04L 45/28 |
| | | | | 714/E11.073 |
| 2011/0305136 | A1* | 12/2011 | Pan | H04L 45/28 |
| | | | | 370/216 |
| 2012/0275295 | A1* | 11/2012 | Tanikawa | H04W 28/18 |
| | | | | 370/217 |
| 2013/0173953 | A1 | 7/2013 | Grammel et al. | |
| 2014/0161437 | A1* | 6/2014 | Miyabe | H04B 10/032 |
| | | | | 398/5 |
| 2016/0036521 | A1* | 2/2016 | Miyabe | H04B 10/032 |
| | | | | 398/5 |
| 2022/0029701 | A1* | 1/2022 | Chhillar | H04B 10/40 |

FOREIGN PATENT DOCUMENTS

| | | |
|---|---|---|
| CN | 102696203 A | 9/2012 |
| CN | 105900378 A | 8/2016 |
| WO | 2011117570 A1 | 9/2011 |

OTHER PUBLICATIONS

Miao Wang et al., "THE Realization of Multiple Connections Per a Call Using RSVP-TE In ASON",Dec. 31, 2006,total:4pages.

Chinese Office Action issued in corresponding Chinese Application No. 201911059334.5, dated Dec. 22, 2021, pp. 1-12.

Yi Lin, RSVP-TE Extensions in Support of Proactive Protection, draft-lin-ccamp-gmpls-proactive-protection-00.txt, CCAMP Working Group, Internet Draft, Nov. 3, 2019, 12 pages.

Carlos Natalino et al., A Proactive Restoration Strategy for Optical Cloud Networks Based on Failure Predictions, ICTON 2018, 5 pages.

Extended European Search Report issued in corresponding European Application No. 20881725.4, dated Oct. 12, 2022, pp. 1-10.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Length             |   Class-Num   |     Type      |
+-+-+-+-+-+-+-+-+-+-+-+-+-+-+-+-+-+-+-+-+-+-+-+-+-+-+-+-+-+-+-+-+
|S|P|N|O|T1| Reserved |   LSP flag    |   Reserved    |  Link flag  |
+-+-+-+-+-+-+-+-+-+-+-+-+-+-+-+-+-+-+-+-+-+-+-+-+-+-+-+-+-+-+-+-+
| I|R|T2| Reserved    |  Segment flag |           Reserved            |
+-+-+-+-+-+-+-+-+-+-+-+-+-+-+-+-+-+-+-+-+-+-+-+-+-+-+-+-+-+-+-+-+
```

FIG. 5D

PATH PROTECTION METHOD AND NETWORK NODE

CROSS-REFERENCE TO RELATED APPLICATIONS

This application is a continuation of International Application No. PCT/CN2020/125477, filed on Oct. 30, 2020, which claims priority to Chinese Patent Application No. 201911059334.5, filed on Nov. 1, 2019. The disclosures of the aforementioned applications are hereby incorporated by reference in their entireties.

TECHNICAL FIELD

The present invention relates to the field of optical network technologies, and in particular, to a path protection method and a network node.

BACKGROUND

A conventional optical network, such as a synchronous digital hierarchy (SDH), a synchronous optical network (SONET), or wavelength division multiplexing (WDM), is a system that is based on centralized management. An optical network node of the conventional optical network is usually "dumb". Manual intervention is required for creation, maintenance, and removal of an optical connection. An optical connection established in this manner is referred to as a permanent connection. An optical network based on a permanent connection can meet neither a requirement of increasing network bandwidth due to continuous growth of IP data services nor a requirement of dynamic and flexible network bandwidth allocation due to uncertainty and unpredictability of an IP data service volume.

An automatically switched optical network (ASON) is an optical network that is defined by the International Telecommunication Union (ITU), that is based on a distributed control plane, and that supports dynamic switching connection. The ASON uses an independent control plane to implement automatic connection management by using various transport networks. The ASON supports dynamic allocation and scheduling connection of network bandwidth, and can effectively optimize the network based on a change in customer layer information such as an IP data service volume. Compared with the conventional optical network, for a same network service requirement, the ASON can greatly reduce network construction costs and improve bandwidth utilization, and can further provide distributed network recovery and greatly improve network reliability.

A core function of the control plane of the ASON is intelligently operating a transport plane. Optical connections of the ASON are divided into three types: a cross-connection, a switching connection, and a soft permanent connection. In an ASON architecture, an ASON node first obtains connection relationships between the ASON node and other ASON nodes by using a link local discovery technology; and then, publishes node and link states of the ASON node by using the control plane, and receives node and link states published by the other ASON nodes. Finally, each ASON node has a "network map" describing an ASON topology, and the "network map" includes node, link, and resource information. When receiving a connection establishment request from customer equipment or a management system, the optical network obtains a feasible path with reference to a specific routing algorithm by using "network map" information, and then drives, by using a signaling protocol, nodes on the path to establish a cross-connection, until a destination node completes dynamic establishment of an optical connection. When a link resource changes due to dynamic establishment or removal of an optical connection or a failure, a corresponding ASON node needs to publish updated node and link state information in time, to implement "network map" resynchronization. When a network failure such as link interruption or a node failure occurs, if an optical connection such as a cross-connection, a switching connection, or a soft permanent connection is interrupted, the control plane can dynamically perform a routing algorithm again, to establish a new optical connection and recover a service. For a metropolitan area/core ASON, real-time rerouting recovery can be performed only after a fiber failure occurs in the network. The recovery is relatively slow, and recovery time is in an order of a hundred milliseconds, such as 200 ms. In addition, a 1+1 dedicated protection group may be configured to implement fast service switching after the network fails. That is, primary and secondary 1+1 dual service path resources are configured to fast ensure service recovery. However, dedicated 1+1 protection is costly and requires double resources.

SUMMARY

Embodiments of this application provide a path protection method and a network node, to shorten service switching time required after an actual failure occurs.

According to a first aspect, a path protection method is provided, including: a source node of a first path receives a path event notify message from a node on the first path, where the path event notify message carries indication information that the first path is predicted to fail; the source node obtains information about a predicted protection path, where the information about the predicted protection path includes resource information of a second path used to protect a service on the first path, and the first path and the second path include the same source node and a same sink node; and the source node stores the resource information of the second path.

According to a second aspect, a path protection method is provided, including: a first node receives information about a predicted protection path from a source node, where the information about the predicted protection path includes resource information of a second path used to protect a service on a first path, and the first node is located on the second path; the first node determines, based on the resource information of the second path, a resource that needs to be reserved by the first node to protect the service on the first path; and the first node marks the second path as a predicted protection path.

According to a third aspect, a path protection method is provided, including: a first node on a first path monitors a performance indicator of a link segment between the first node and a neighboring node; and the first node determines that the performance indicator of the link segment between the first node and the neighboring node exceeds a preset critical value due to degradation; and the first node sends a path event notify message to a source node of the first path, where the path event notify message carries indication information that the first path is predicted to fail, the path event notify message is used by the source node to obtain information about a protection path for the predicted failure, the information about the predicted protection path includes resource information of a second path used to protect a service on the first path, and the first path and the second path include the same source node and a same sink node.

According to a fourth aspect, a network node is provided. The network node is a source node of a first path and includes: a receiving module, configured to receive a path event notify message from a node on the first path, where the path event notify message carries indication information that the first path is predicted to fail; an obtaining module, configured to obtain information about a predicted protection path, where the information about the predicted protection path includes resource information of a second path used to protect a service on the first path, and the first path and the second path include the same source node and a same sink node; and a storage module, configured to store the resource information of the second path.

According to a fifth aspect, a network node is provided, including: a receiving module, configured to receive information about a predicted protection path, where the information about the predicted protection path includes resource information of a second path used to protect a service on a first path, and the network node is located on the second path; and a processing module, configured to: determine, based on the resource information of the second path, a resource that needs to be reserved by the network node to protect the service on the first path; and mark the second path as a predicted protection path.

According to a sixth aspect, a network node is provided. The network node is located on a first path and includes: a monitoring module, configured to monitor a performance indicator of a link segment between the network node and a neighboring node on the first path; a processing module, configured to determine that the performance indicator of the link segment between the network node and the neighboring node exceeds a preset critical value due to degradation; and a sending module, configured to send a path event notify message to a source node of the first path, where the path event notify message carries indication information that the first path is predicted to fail, the path event notify message is used by the source node to obtain information about a protection path for the predicted failure, the information about the predicted protection path includes resource information of a second path used to protect a service on the first path, and the first path and the second path include the same source node and a same sink node.

According to a seventh aspect, a path protection method is provided, including: a branch node between a source node and a sink node of a first path obtains a path event notify message from a first intermediate node on the first path, where the first intermediate node and the branch node are a same node or the first intermediate node is located between the branch node and a merge node, the merge node is located between the branch node and the sink node, and the path event notify message carries indication information that a first path segment between the branch node and the merge node is predicted to fail; the branch node obtains information about a predicted protection path, where the information about the predicted protection path includes resource information of a second path segment used to protect a service on the first path segment, and the second path segment is connected to the branch node and the merge node; and the branch node stores the resource information of the second path segment.

According to an eighth aspect, an embodiment of this application further provides a network node. The network node is a branch node between a source node and a sink node of a first path and includes:

a first obtaining module, configured to obtain a path event notify message from a first intermediate node on the first path, where the first intermediate node and the branch node are a same node or the first intermediate node is located between the branch node and a merge node, the merge node is located between the branch node and the sink node, and the path event notify message carries indication information that a first path segment between the branch node and the merge node is predicted to fail; a second obtaining module, configured to obtain information about a predicted protection path, where the information about the predicted protection path includes resource information of a second path segment used to protect a service on the first path segment, and the second path segment is connected to the branch node and the merge node; and a storage module, configured to store the resource information of the second path segment.

BRIEF DESCRIPTION OF DRAWINGS

To describe technical solutions in embodiments or the background of this application more clearly, the following describes the accompanying drawings used in the embodiments or the background of this application.

FIG. 5D is a schematic diagram of an extended LSP protection object field;

DESCRIPTION OF EMBODIMENTS

Figure 1:
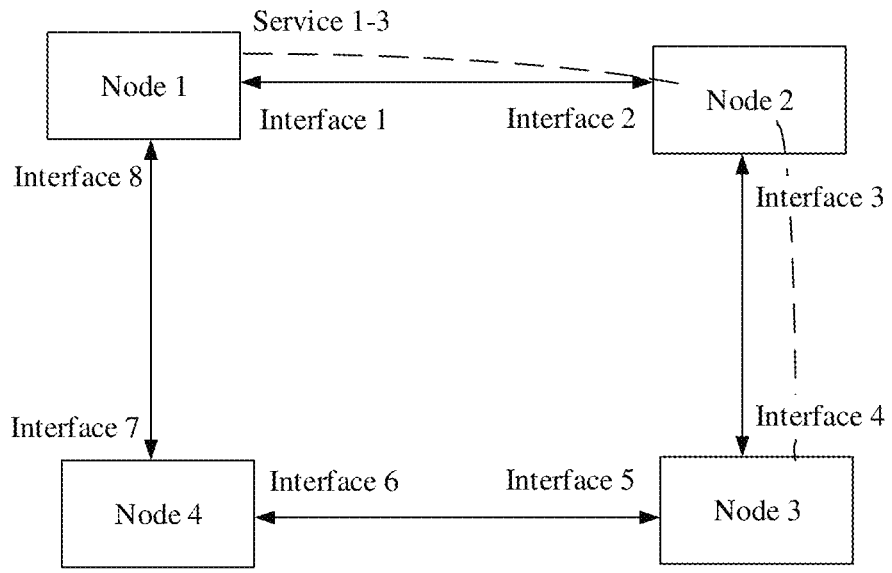
FIG. 1 is a schematic diagram of an ASON architecture according to an embodiment of this application.

For ease of understanding technical solutions in embodiments of this application, the following first briefly describes technologies related to this application.

Node: The node is used to indicate an independent hardware entity in a network, and is usually a transport network device. For example, in FIG. 1, there are four nodes: a node 1, a node 2, a node 3, and a node 4.

Interface: The interface is a physical port that is of a node and that is configured to send and receive network protocol messages and traffic data. For example, in FIG. 1, there are eight interfaces: an interface 1, an interface 2, an interface 3, an interface 4, an interface 5, an interface 6, an interface 7, and an interface 8.

Link: The link is used to indicate a connection relationship between two nodes. One link is indicated by (node-interface) pairs, indicating that protocol messages and traffic data can be forwarded between two nodes. For example, a link (node 1-interface 1, node 2-interface 2) indicates that a protocol message and traffic data can be sent from the interface 1 of the node 1 and then received by the interface 2 of the node 2. For example, there are eight links in FIG. 1: a link 1-2 (node 1-interface 1→node 2-interface 2), a link 1-4 (node 1-interface 8→node 4-interface 7), a link 2-1 (node 2-interface 2→node 1-interface 1), a link 2-3 (node 2-interface 3→node 3-interface 4), a link 3-2 (node 3-interface 4→node 2-interface 3), a link 3-4 (node 3-interface 5→node 4-interface 6), a link 4-3 (node 4-interface 6→node 3-interface 5), a link 4-1 (node 4-interface 7→node 1-interface 8).

Service: The service is used to indicate that a physical channel connection between two nodes is established, and data traffic can be sent from a source node and received by a sink node. For example, in FIG. 1, there is a service 1-3, indicating that there is a connectable data channel between the node 1 and the node 3.

An ASON can provide fast end-to-end establishment, query, deletion, attribute modification, and recovery functions of a service by using Reservation Protocol-Traffic Engineering (RSVP-TE). A network management system delivers a service creation command to a source node network element, and then the source node network element implements route computation and initiates a service configuration process by using the RSVP-TE signaling protocol, to establish a cross-connection point by point from the source node to downstream nodes to complete service creation. This manner fully uses routing and signaling functions of each network element and shortens service configuration time. As shown in FIG. 1, specific steps of establishing a path for a service 1-3 by using RSVP-TE signaling are as follows: The source node 1 computes a service path by using constrained shortest path first (CSPF): node 1-node 2-node 3. The source node carries end-to-end path information along the computed path to designate an interface of a link 1-2 to send a Path message (a type of an RSVP-TE packet) to the intermediate node 2. After receiving the signaling message, the node 2 parses out cross-configuration association information of the node and establishes a reverse cross-connection, and then the intermediate node 2 carries an end-to-end path message to designate an interface of a link 2-3 to send a Path message to the sink node 3. Likewise, the sink node 3 parses out a corresponding cross-configuration message and establishes a reverse cross-connection of the station. The sink node 3 sends a Resv message (a type of an RSVP-TE packet) to the source node 1 through the intermediate node 2. Each node establishes a forward cross-connection along the path. In the same process, the source node 1 sends a Path message to the sink node 3 through the intermediate node 2, and enables alarm monitoring of the service along the path, and the sink node 3 sends a Resv message to the source node 1 through the intermediate node 2 for acknowledgment. In the entire process, end-to-end configuration establishment of the service 1-3 is automatically completed by using the RSVP-TE signaling.

The following further describes the technical solutions in the embodiments of this application with reference to the accompanying drawings in the embodiments of this application. In descriptions of this application, "/" means "or" unless otherwise specified. For example, A/B may represent A or B. In this specification, "and/or" describes only an association relationship for describing associated objects, and represents that three relationships may exist. For example, A and/or B may represent the following three cases: Only A exists, both A and B exist, and only B exists. In addition, in the description of this application, "a plurality of" means two or more than two, unless otherwise specified. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity and an execution sequence, and the terms such as "first" and "second" do not indicate a definite difference.

A network architecture and a service scenario described in the embodiments of this application are intended to describe the technical solutions in the embodiments of this application more clearly, and do not constitute any limitation on the technical solutions provided in the embodiments of this application. A person of ordinary skill in the art may know that, with evolution of the network architecture and emergence of a new service scenario, the technical solutions provided in the embodiments of this application are also applicable to a similar technical problem.

After a fiber cut failure occurs in a network, to recover a service within 50 ms, dedicated 1+1 protection of the service needs to be configured, and therefore costs are doubled. If 1+1 protection is not configured for the service, real-time rerouting recovery is performed on the service after fiber cut, and shortest recovery time can reach an order of a hundred milliseconds, such as 200 ms. In the embodiments of this application, to implement fast service recovery without doubling service costs, a failure to be occurred on a path is predicted, and resource information used to protect the to-be-failed path is obtained, so that fast recovery can be implemented when the failure actually occurs.

Figure 2:
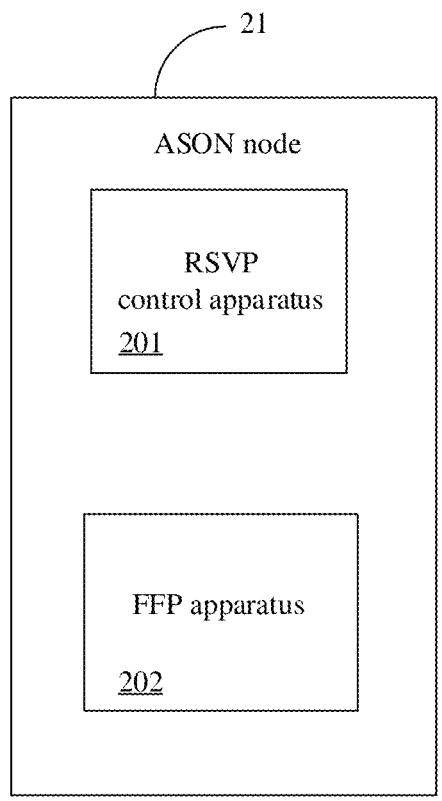
FIG. 2 is a schematic diagram of a structure of an ASON node according to an embodiment of this application.
Figure 3:
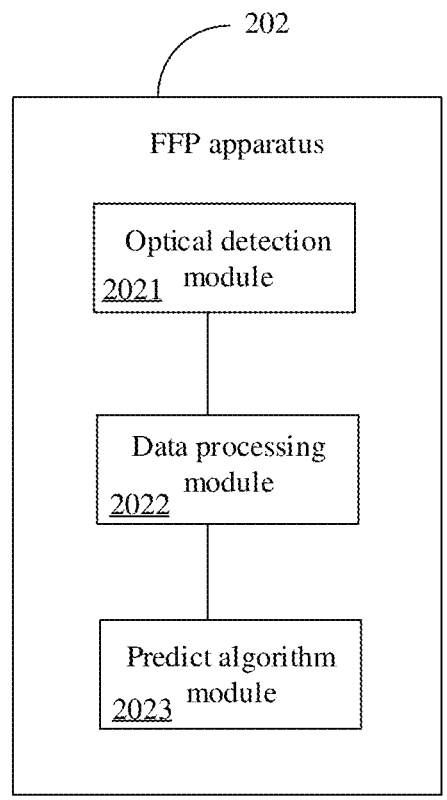
FIG. 3 is a schematic diagram of a structure of a fiber failure predict (FFP) apparatus according to an embodiment of this application.

FIG. 2 is a schematic diagram of a structure of an ASON node according to an embodiment of this application. FIG. 3 is a schematic diagram of a structure of an FFP apparatus according to an embodiment of this application. As shown in FIG. 2, an ASON node 21 includes a resource reservation protocol (RSVP) control apparatus 201 and a fiber failure predict (FFP) apparatus 202. As shown in FIG. 3, the FFP apparatus includes an optical detection module 2021, a data processing module 2022, and a predict algorithm module 2023. The optical detection module 2021 monitors a state of polarization (SOP)/optical power/a bit error rate (BER) or a similar optical performance parameter of an optical channel (OCH) layer or an optical transmission section (OTS) layer in real time. A sampling period of parameter monitoring may be configured, based on requirements, to range from a minute order to a nanosecond order. The optical detection module 2021 transmits data to the data processing module 2022 based on the configured sampling period. After receiving the optical performance parameter, the data processing module 2022 performs, for example, burr filtering processing, data normalization, data rotation alignment, or other similar data processing on the optical performance parameter. Because the burr filtering processing, the data normalization, and the data rotation alignment are relatively conventional data processing manners, processing details are not described herein. The predict algorithm module 2023 may perform modeling on the optical performance physical parameter, to predict and perceive a fiber failure change by using a neural network algorithm, and fast notify the RSVP control apparatus of the fiber failure change. For example, abnormality determining may be started after a change speed of the SOP exceeds a specific threshold (for example, 2). In consideration of a change of an optical performance indicator, namely, the BER/optical power/SOP, in continuous time, for example, if the optical power is degraded by 1 decibel (dB), the BER is reduced by one order of magnitude through degradation, or an abnormal change of the SOP lasts for a hundred milliseconds, it is determined that abnormality occurs. With reference to the neural network algorithm, the predict algorithm module 2023 performs alarming, predicts a fiber failure, and sends a path event notify message to the RSVP control apparatus 201. The path event notify message carries failure type indication information that a first path on which a source node and a failure monitoring node are located is predicted to fail. The predict algorithm module 2023 may perform modeling on the optical performance physical parameter based on learned historical data by using artificial intelligence (AI), machine learning (ML), or another technology. Through modeling, the predict algorithm module 2023 may predict whether a failure is to occur within a future period of time. After receiving, from the FFP apparatus 202, the failure type indication information that the first path is predicted to fail, the RSVP control apparatus 201 completes fast establishment of a service backup channel, and also establishes a temporary protection group. After the predicted failure actually occurs, a service is fast switched, and switching can be completed within 50 ms in terms of performance. When the predicted failure does not actually occur or an occurred actual failure is inconsistent with a predicted point, releasing of the service backup channel and control processing of real-time resource preemption that may need to be performed for the actual failure need to be completed.

In this embodiment of this application, the FFP apparatus is deployed in the ASON node, and RSVP is extended to enable path protection of a failure predict type, to achieve 50 ms service recovery performance That is, under 1+R (R>1) shared resource costs, one protection path may be used to protect a plurality of working paths, and 50 ms service recovery performance required by dedicated 1+1 protection dual resources is achieved by using this technology.

Figure 4:
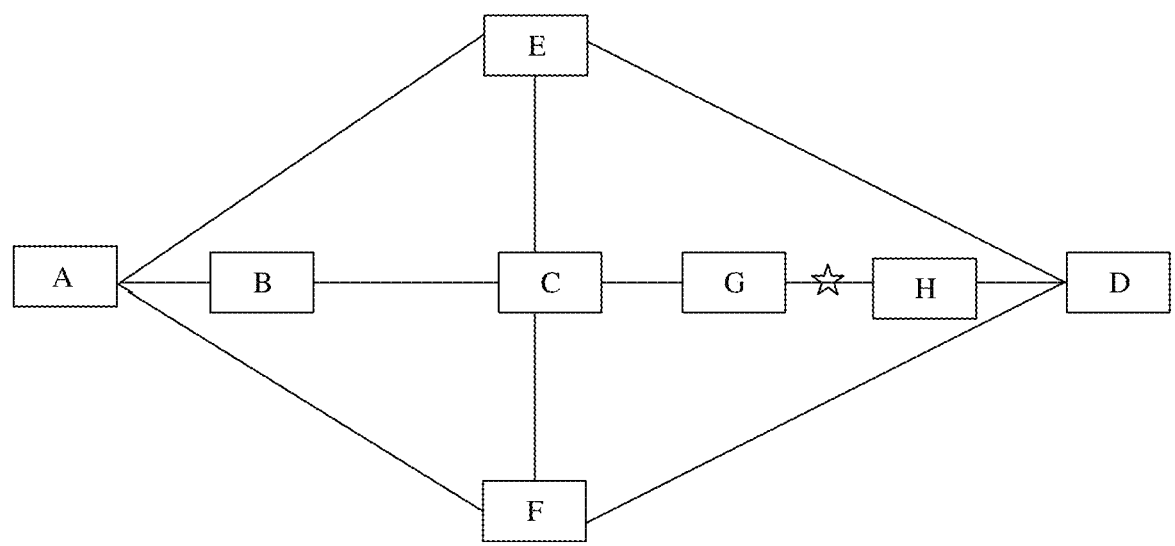
FIG. 4 is a schematic diagram of an architecture of a network system that implements path protection in an embodiment of this application.

FIG. 4 is a schematic diagram of an architecture of a network system that implements path protection in an embodiment of this application. As shown in FIG. 4, an entire metropolitan area/core network is a GMPLS network/an ASON, has an ASON automation function, and has six ASON electrical nodes: A, B, C, D, E, and F. G and H are two optical nodes, there is an optical layer C-G-H-D in an electrical layer link C-D, and similar to C-D nodes, there is an OCH in a link of any other two electrical nodes.

The nodes A, B, C, D, E, and F all enable an ASON function, and an FFP apparatus is disposed in each node. After a metropolitan area/core network device is normally started, all the ASON nodes enable an FFP function. In this case, the FFP apparatus can normally serve monitoring prediction. Network information such as network-wide nodes and links is automatically obtained by using OSPF/OSPF-TE of an ASON protocol, and end-to-end service path provisioning and recovery are automatically established by using RSVP-TE of the ASON protocol. A path computation element (PCE) automatically obtains network-wide node, link, and service information according to a protocol such as OSPF/PCEP. The PCE mainly processes end-to-end path computation of a network service, and may be deployed in a server network management system or a similar device. If there is no PCE in the network, the end-to-end path of the network service may be computed by the nodes in a distributed manner.

Figure 5A:
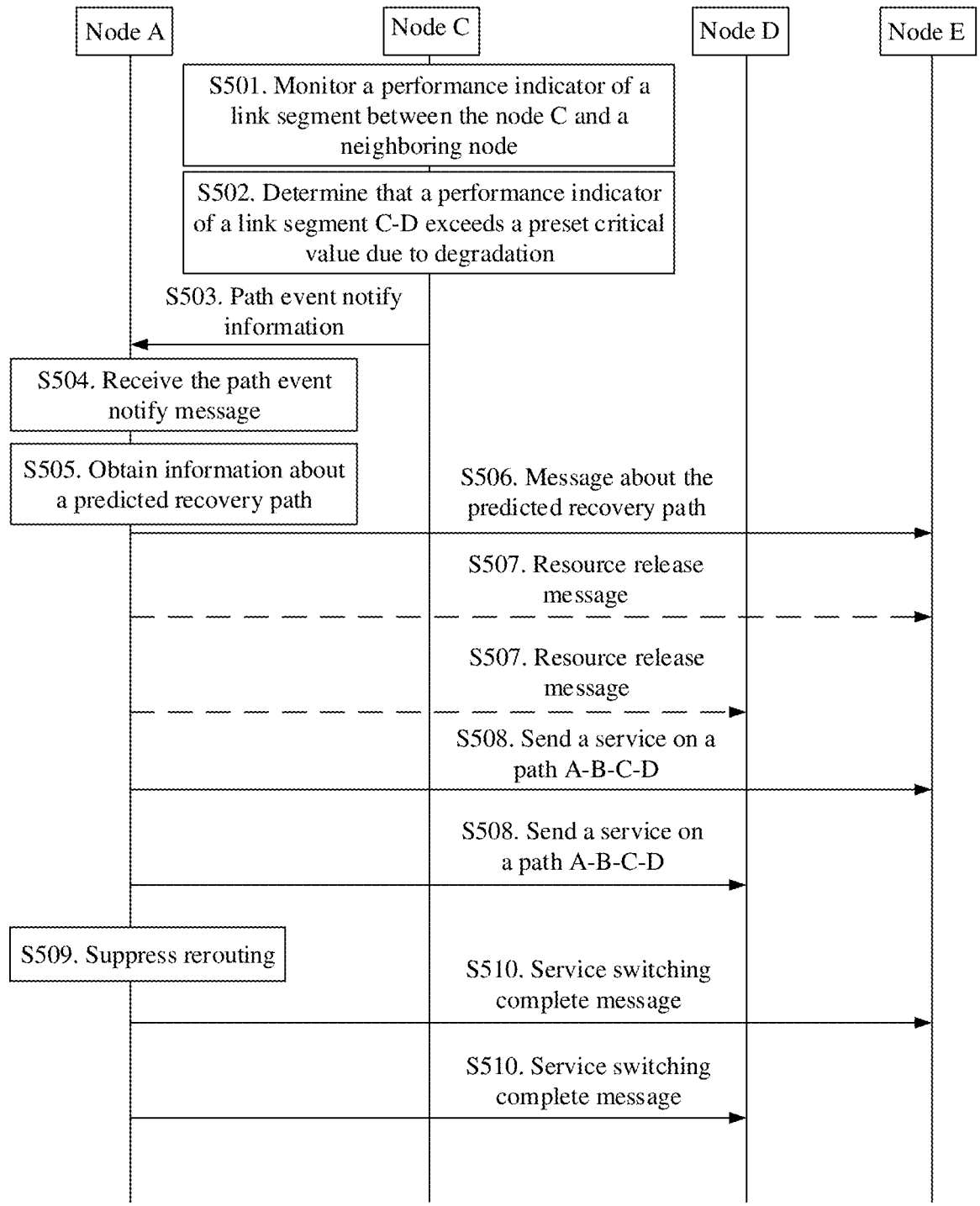
FIG. 5A is a schematic flowchart 1 of a path protection method according to an embodiment of this application.

FIG. 5A is a schematic flowchart 1 of a path protection method according to an embodiment of this application. With reference to FIG. 4 and FIG. 5A, extended RSVP-TE is described by using a service path A-B-C-D as an example, and a specific procedure of implementing path protection with reference to a temporary protection group and a predict apparatus is as follows:

S501. The intermediate node C monitors a performance indicator of a link segment between the intermediate node C and a neighboring node.

The node C enables an FFP predict function, and the node C detects a link status of a link segment C-D by collecting a millisecond-order optical performance indicator (such as a SOP/a BER/optical power).

S502. The node C determines that a performance indicator of the link segment C-D exceeds a preset critical value due to degradation.

The node C may perform modeling by using an AI classification model, to predict and perceive an OCH fiber failure on the link segment C-D, and generate an OTU port predict alarm.

S503. The node C sends path event notify information to the source node A, where the path event notify message carries indication information that the path is to fail.

After generating the port predict alarm, an FFP apparatus of the node C notifies an ASON protocol module of the alarm. The node C locally finds an affected service A-B-C-D based on specific OTU port predict alarm information, and transmits the OTU port predict alarm information to the source node A by using an RSVP Notify message.

Figure 5B:
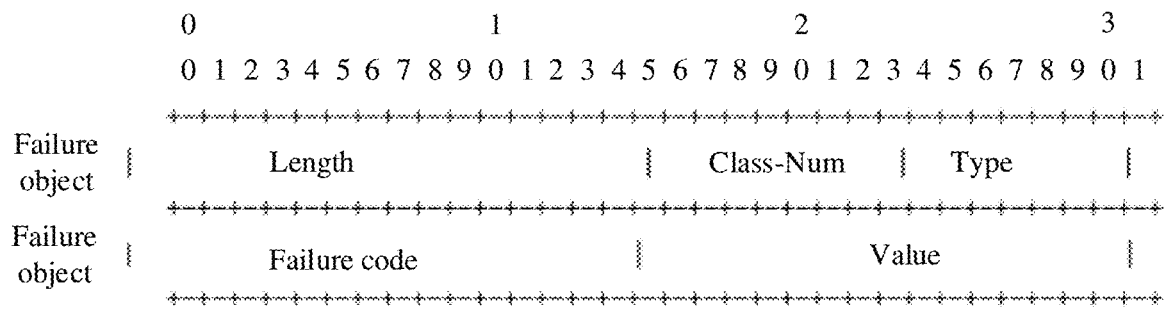
FIG. 5B is a schematic diagram of a related field used to indicate a failure type in a resource reservation protocol (RSVP) notify message.

The RSVP Notify message is a path event notify message. For a format of the RSVP Notify message, refer to an existing Notify message. In addition to an ID of the affected-service and failure point information, an extended failure point type further needs to be carried in the message. The failure point type includes a predicted-failure type and an actual-failure type. Specific packet format information is shown in FIG. 5B. In addition, the message optionally carries information about a predicted time window, indicating that the path A-B-C-D is predicted to fail in the time window. The failure may be a failure of the link between the node C and the neighboring node, or a failure of a port of the node C. The information that is about the predicted time window and that is carried in the Notify message provides optimal ideal-time occupation for subsequent monitoring of a resource of a predicted protection path. If no failure occurs in the predicted time window, the resource of the predicted protection path can be fast released, so that the resource of the predicted protection path can be provided for another service for use, thereby ensuring high network-wide resource utilization.

A related field that is in the RSVP Notify message and that is used to indicate the failure type is shown in FIG. 5B, and a meaning is shown in Table 1.

TABLE 1

| Field name | Meaning | Value |
| --- | --- | --- |
| Length | Total object length in a unit of byte | 16-bit value |
| Class-Num | Identify an object class, where each object class has a name | 8-bit value |
| Type | Object type, unique in Class-Num | 8-bit value |
| Failure code | Failure type, where a value is obtained through extension to indicate the predicted-failure type | 16-bit value |

S504. The source node A receives the path event notify message from the node C, where the path event notify message carries the indication information that the path is predicted to fail.

After receiving a predict alarm type and the affected service that are carried in the Notify message, the source node A determines that there is a predicted failure.

S505. The source node A obtains information about a predicted protection path, where the information about the predicted protection path includes resource information of A-E-D used to protect the service of A-B-C-D, and the paths A-B-C-D and A-E-D include the same source node and a same sink node.

After determining that there is a predicted failure, the source node A computes the end-to-end predicted protection path A-E-D, including slot/wavelength information corresponding to the predicted protection path. The predicted path may be computed either in real time or in advance, and may be computed by using a PCE/distributed nodes. This is not limited herein, and high efficiency is achieved through advance computation. The source node stores the resource information of A-E-D.

If the source node A generates an ID of the predicted protection path, A is used as a source node, and D is used as a sink node, to extend RSVP-TE to strictly designate the predicted protection path A-C-E to establish a cross-configuration hop by hop (a Path/Resv message).

Figure 5C:
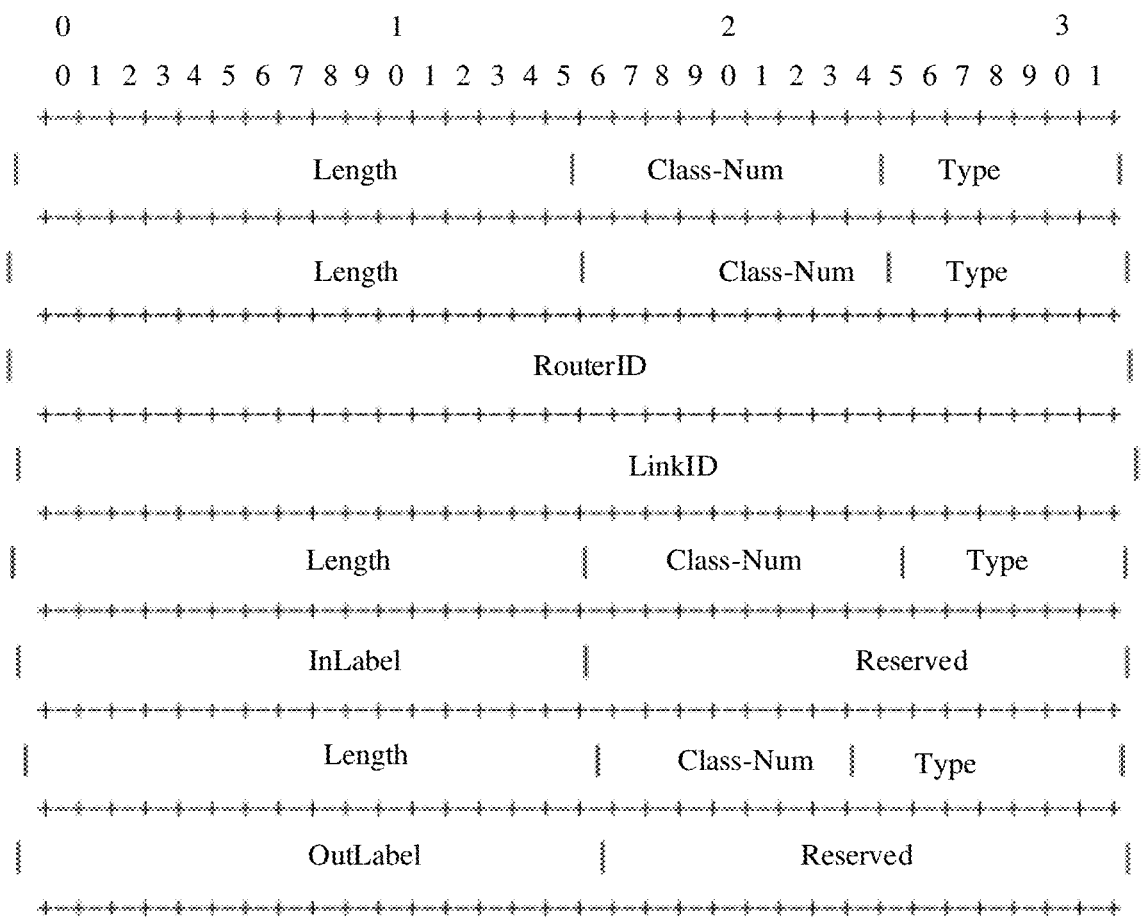
FIG. 5C is a schematic diagram of object format information that is of an extended predicted protection path type and that is carried in Path information.

The source node A extends an existing HOP object to obtain a predicted protection path type and adds the predicted protection path type to Path information, where specific object format information is shown in FIG. 5C; or extends an original label switching path (LSP) protection object field, and adds a bit to indicate a predicted protection path type. Both the two manners can be used. If the source node A perceives that there is a predicted-failure type and a same cross-source, the source node A performs conversion into a temporary protection group (for example, SNCP) configuration and establishes an identity perception. The original path A-B-C-D is a primary working channel, and the established new path A-E-D is a secondary protection channel.

A TYPE field in an existing HOP type is extended to indicate the predicted protection path type. A specific object packet format is shown in the following table.

A specific field meaning is shown in the following table:

TABLE 2

| Field name | Meaning | Value |
| --- | --- | --- |
| Length | Total object length in a unit of byte | 16-bit value |
| Class-Num | Identify an object class, where each object class has a name | 8-bit value |
| Type | Object type, unique in Class-Num, where an extended field value indicates the predicted protection path type | 8-bit value |
| RouterID | Node ID address | 32-bit value |
| LinkID | Outgoing link ID | 32-bit value |
| InLabel | Incoming label, indicating a channel/wavelength | 16-bit value |
| Reserved | Reserved byte | 16-bit value |
| OutLabel | Outgoing label, indicating a channel/wavelength | 16-bit value |
| Reserved | Reserved byte | 16-bit value |

In another manner, the original LSP protection object field is extended. As shown in FIG. 5D, two bits, T1 and T2, are added to the original protection object field, to respectively indicate end-to-end temporary protection and segment temporary protection. Whether enabled protection is 1+1 or 1:1 is indicated by an original LSP flag and segment flag. The two bits, T1 and T2, are mainly used to enable a node on the protection path to know that the resource of the predicted protection path is used for temporary protection, and can be preempted by a rerouted path of the node.

A specific field meaning is shown in the following table:

TABLE 3

| Field name | Meaning | Value |
| --- | --- | --- |
| Length | Total object length in a unit of byte | 16-bit value |
| Class-Num | Identify an object class, where each object class has a name | 8-bit value |
| Type | Object type, unique in Class-Num | 8-bit value |
| T1 | End-to-end predicted temporary protection | 1-bit value |
| T2 | Segment predicted temporary protection | 1 bit |

S506. The intermediate node E receives the information about the predicted protection path from the source node A, where the information about the predicted protection path includes the resource information of A-E-D; and the node E determines information about a resource that needs to be reserved to protect the service on the path A-B-C-D.

The intermediate node E receives an RSVP-TE PATH message from the source node A, and parses a failure type field in the RSVP-TE Path message. The node E reserves the resource, and the reserved resource includes an ingress port slot and an egress port slot. After receiving an RESV (reserved) message that is sent from the sink node hope by hope and that displays resource reservation completion, the node E determines whether there is a same cross-source/sink. If there is no same cross-source/sink, the node E cross-establishes a service in an original manner, and marks the service path as a predicted protection path.

After receiving the RSVP-TE PATH message, the sink node D performs same operations as the node E, that is, first reserves a resource, and checks whether there is a same cross-sink; and performs conversion into a temporary SNCP protection group configuration. The original path A-B-C-D is a primary working channel, and established new A-E-D is a secondary protection channel. After a success, the node D responds to the source node A with an RESV message hop by hop.

S507. The source node A determines that the service on the path A-B-C-D does not fail in the predicted time window, and the source node A sends resource release messages to the other nodes on the path A-E-D. The information about the predicted time window is carried in the path event notify message, and the information about the predicted time window indicates that a node of A-B-C-D is to fail in the predicted time window.

After successfully establishing the predicted protection path A-E-D, the source node stores information about a predicted port and the predicted protection path. The source node A enables a monitoring time window of the predicted protection path A-E-D. The source node may notify a predicted-port failure time attribute by using a Notify message, to set different time window policies. If determining that the service on the path A-B-C-D does not fail in the predicted time window, the source node sends the resource release messages to the nodes on the path A-E-D, to achieve ideal occupation of the resource of the predicted protection path, so that a waste of resource is not caused due to long-time resource occupation, thereby ensuring high network-wide resource utilization. After the resource of the predicted protection path is released, the original path A-B-C-D is kept in a working state.

Herein, the indication information that the first path is to fail that is carried in the path event notify message may specify a specific link segment that is to fail. For example, the source node A receives the path event notify message from the node C, and the path event notify message carries an indication message that the link segment C-D is to fail. The source node A enables the predicted monitoring time window. If the C-D port link does not actually fail in the predicted time window and the source node A receives no protection group switching event, the source node A enables deletion of the predicted protection path, and releases the resource of the predicted protection path, including releasing a channel slot and a wavelength that are related to the predicted protection path, thereby ensuring high network-wide resource utilization.

That the source node A enables deletion of the predicted protection path includes performing end-to-end service cross-configuration deletion on a cross- and temporary protection group of the predicted protection path by adding the ID of the predicted protection path to RSVP-TE. For a deletion procedure, refer to a procedure of deleting a common service by using RSVP. The temporary protection group is created to avoid service interruption caused by active switching still performed when no actual failure occurs. In this embodiment of this application, it can be ensured that when no actual failure occurs, a switching action is not performed on an original service, so that the service is lossless; and only after an actual fiber cut failure occurs, the service is switched by using a protection group protocol detection mechanism.

S508. The source node A determines that the service on the path A-B-C-D fails within predicted time, and the source node A sends the service on the path A-B-C-D to the other nodes on the path A-E-D.

Herein, the other nodes on A-E-D are nodes on A-E-D other than the node A, that is, the node E and the node D. A case in which no failure occurs in the predicted time window is described above in S507. S508 to S510 further describe a procedure performed after the service on the path A-B-C-D actually fails, for example, an action procedure performed after the service is interrupted after the link segment C-D fails. S507 and S508 to S510 are parallel solutions, and are not simultaneously performed. For distinguishing, in FIG. 5A, a line corresponding to step S507 is indicated by a dashed line. After an actual fiber cut failure occurs on the segment C-D predicted to fail, and an actual alarm is generated, for a protocol processing procedure, refer to an existing procedure. First, the node C searches the node C for the affected service based on an actual failure point, and notifies the affected-service source node A of the affected service. After the failure is detected by using a protection group protocol, the service is fast switched to the secondary service path A-E-D by using hardware. The instantaneously interrupted service can be fast recovered within 50 ms. In addition, after perceiving the protection group switching event, single-station ASON software determines whether an attribute of a switched service path is a predicted protection path. If the attribute of the switched service path is a predicted protection path, the single-station ASON software needs to notify the service source node A of protection switching information, and extend the RSVP Notify information, to notify of the ID of the service, and notify that the path A-E-D is a service working path.

S509. The source node A receives actual path failure information sent by the node C; and if determining that the actual path failure information is consistent with predicted path failure information, the source node A suppresses rerouting.

The indication information that the first path is predicted to fail that is carried in the path event notify message received by the source node A may further include a port number for sending the notify message. The source node A may perform matching searching based on port information, to determine whether a port number is the same as the port number carried in the path event notify message. If the port number is consistent with the port number carried in the path event notify message, the source node A may suppress real-time rerouting; otherwise, perform a normal real-time rerouting process.

S510. The source node A receives service switching complete messages from the other nodes on A-B-C-D, where the service switching complete messages indicate that the service on the path A-B-C-D has been switched to A-E-D; and the source node A sets an attribute of the path A-E-D to a working path.

If the source node A receives the service switching information and a working path is A-E-D, the source node A refreshes working path information, and reports a service recovery success event to a network management system; and also enables end-to-end service attribute refreshing. An end-to-end service attribute of A-E-D is updated from "predicted protection path" to "working path" after the refreshing. The node A, the node E, and the node D all refresh service attributes of A-E-D that are stored in the nodes, to prevent subsequent resource preemption.

Herein, the source node A may refresh RSVP-TE Path information by using A as a source node and using D as a sink node, that is, refresh end-to-end service attribute information, set the path A-E-D to a working path, and identify that the path A-E-D is no longer a predicted protection path.

According to the path protection method in this embodiment of this application, a failure is predicted and a protection resource is temporarily reserved, without a need to initiate, after a failure occurs, signaling in real time for rerouting, so that service switching time required after an actual failure occurs can be shortened.

Figure 6:
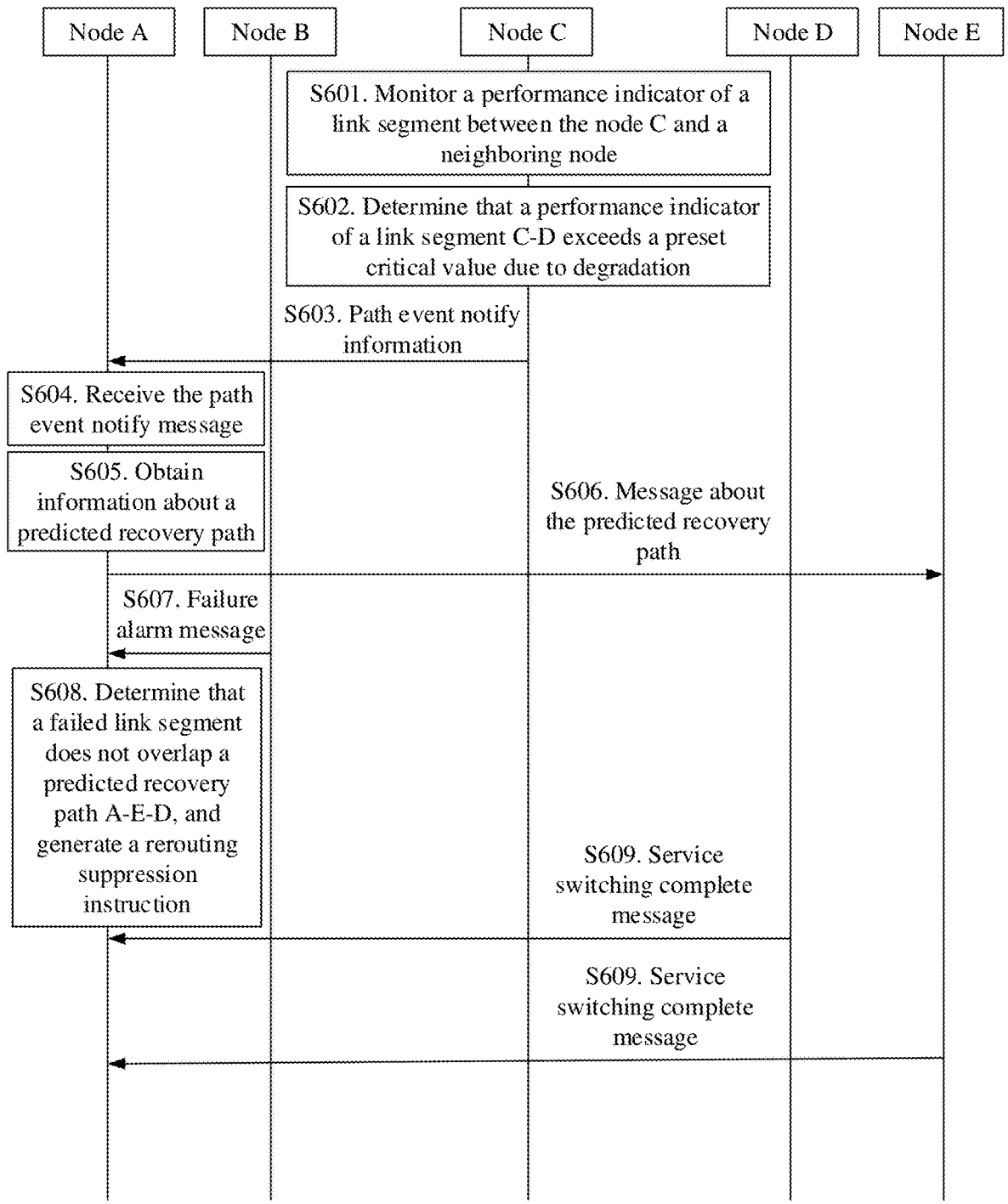
FIG. 6 is a schematic flowchart 2 of a path protection method according to an embodiment of this application.

FIG. 6 is a schematic flowchart 2 of a path protection method according to an embodiment of this application. The architecture of the network system in FIG. 4 is also applicable to the path protection method shown in FIG. 6. Herein, a service path A-B-C-D is used as an example to describe a path protection method in which a predicted failed link segment does not fail, another link segment on the same service path A-B-C-D actually fails, and a resource occupied by the actual failed link segment does not conflict with that of a predicted protection path.

With reference to FIG. 4 and FIG. 6, the service path A-B-C-D is used as an example to describe the following specific path protection procedure:

S601 to S606 are consistent with S501 to S506 in content. The predicted protection path is A-E-D, and an original working path is A-B-C-D. The following starts description from S607.

S607. The source node A receives, from a port of the node B on the path A-B-C-D, a failure alarm message generated by the node B, where the failure alarm message indicates that a link segment B-C fails.

A fiber cut failure actually occurs on the segment B-C. Consistent with a real-time rerouting procedure, after detecting the actual failure, the node B notifies the affected-service source node A of the actual failure.

S608. The source node A determines that the failed link segment does not overlap the predicted protection path A-E-D, and generates a rerouting suppression instruction, where the rerouting suppression instruction is used to indicate that the source node A does not need to enable rerouting.

After receiving an actual alarm that the link segment B-C fails and information about the affected service, the source node A determines whether actual alarm port information is consistent with a predicted alarm port information. If a predicted alarm port C-D (a port that is of the node C and that is connected to the node D) is inconsistent with an actual alarm port B-C (a port that is of the node B and that is connected to the node C), the source node A continues to determine whether the predicted protection path passes through the actual alarm port. In this case, the predicted protection path is A-E-D, the actual failed link segment is B-C, and the failed link segment does not overlap the predicted protection path, and therefore it can be determined that the predicted protection path can be used to recover from the actual failure on the segment B-C, and the source node A suppresses a real-time rerouting process.

Although a predicted failure point is inconsistent with an actual failure point, the predicted protection path can be used to recover from the occurred failure. Therefore, the predicted protection path can be directly used to recover from the occurred failure.

S609. The source node A receives service switching complete messages from the other nodes on the path A-B-C-D, where the service switching complete messages indicate that the service on the path A-B-C-D has been switched to the path A-E-D; and the source node A sets an attribute of A-E-D to a working path.

After receiving the service switching complete messages, the source node A perceives that a service data plane path has been switched to the predicted protection path, and therefore refreshes local end-to-end service attribute information. The procedure is consistent with that in S510. The source node may refresh the end-to-end service attribute information by using an RSVP Path message.

When a non-predicted failure point actually fails, and a resource occupied by an actual failed link segment does not conflict with a resource of a predicted protection path, an association relationship between the actual failure point and a predicted failure point is mainly determined. When the predicted failure point is inconsistent with the actual failure point, it is necessary to determine whether the predicted protection path overlaps the actual failure point. If the predicted protection path does not overlap the actual failure point, the predicted protection path can be used to recover from the actual failure, and a service can be still recovered within 50 ms. If the predicted protection path overlaps the actual failure point, real-time rerouting needs to be enabled for recovery.

Figure 7:
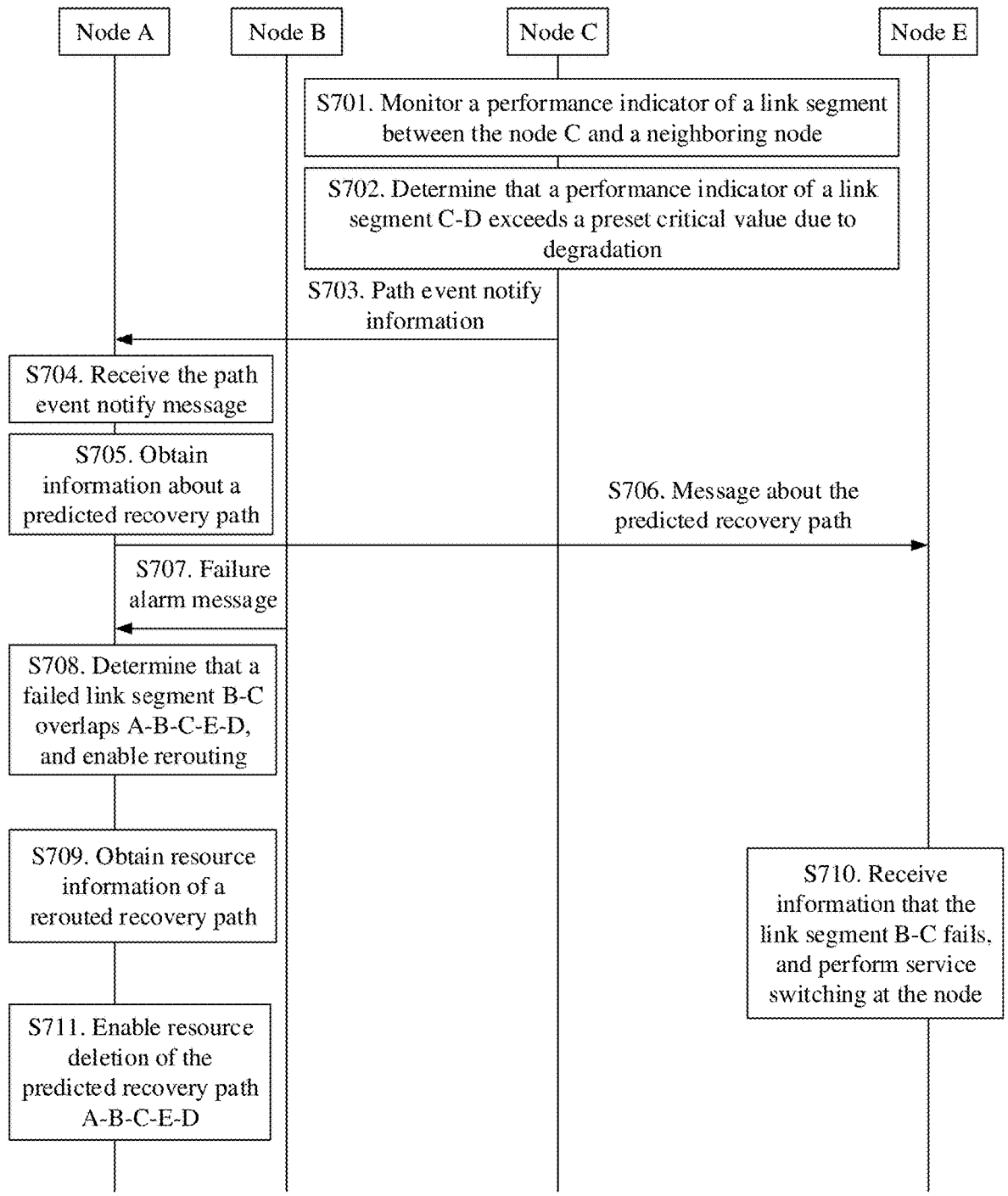
FIG. 7 is a schematic flowchart 3 of a path protection method according to an embodiment of this application.

FIG. 7 is a schematic flowchart 3 of a path protection method according to an embodiment of this application. The architecture of the network system in FIG. 4 is also applicable to the path protection method shown in FIG. 7. Herein, a service path A-B-C-D is used as an example to describe a path protection method in which a predicted failed link segment does not fail, another link segment on the same service path A-B-C-D actually fails, and a resource occupied by the actual failed link segment conflicts with that of a predicted protection path.

With reference to FIG. 4 and FIG. 7, the service path A-B-C-D is used as an example to describe the following specific path protection procedure:

For specific details of S701 to S706, refer to S501 to S506. A difference is that the established predicted protection path is A-B-C-E-D (instead of A-E-D), and an original working path is A-B-C-D. For the predicted failure on the link segment C-D in the path A-B-C-D, an end-to-end predicted protection path A-E-D may be computed, or a part of link segments in A-B-C-D may be shared. A link segment from a branch node to a sink node is determined, where the branch node is a node between the source node A and a node that is on the failed link segment and that is close to the source node A (including the node close to the source node A). For example, in A-B-C-E-D, the node C is a branch node.

The following starts description from S707.

S707. The source node A receives, from a port of the node B on the path A-B-C-D, a failure alarm message generated by the node B, where the failure alarm message indicates that a link segment B-C fails.

A fiber cut failure actually occurs on the segment B-C. Consistent with a real-time rerouting procedure, after receiving an actual failure alarm, the node B generates the failure alarm message to notify the affected-service source node A of the actual failure alarm. In this case, it is detected that a secondary link segment C-E-D and the primary link segment C-D of a protection group do not actually fail, and therefore switching is not performed.

S708. The source node A determines that the failed link segment B-C overlaps A-B-C-E-D, and enables rerouting.

After receiving the actual alarm that the link segment B-C fails and information about the affected service, the source node A determines whether actual alarm port information is consistent with a predicted alarm port information. If a predicted alarm port C-D (a port that is of the node C and that is connected to the node D) is inconsistent with an actual alarm port B-C (a port that is of the node B and that is connected to the node C), the source node A continues to determine whether the predicted protection path passes through the actual alarm port. In this case, the predicted protection path is A-B-C-E-D, the actual failed link segment is B-C, and the failed link segment overlaps the predicted protection path, and therefore it can be determined that the predicted protection path cannot be used to recover from the actual failure on the segment B-C, and the source node A enables a real-time rerouting process.

S709. The source node A obtains resource information of a rerouted recovery path used to protect the service on the path A-B-C-D.

After determining that the failed link segment B-C overlaps A-B-C-E-D, the source node A computes a new rerouted recovery path A-E-D, where the node A is used as a source node, and D is used as a sink node; and creates a Path State message by using RSVP-TE, where the Path State message carries a failure type of the actual failure. The source node A needs to determine whether the protection resource of the predicted protection path conflicts with that of the actual rerouted recovery path. (1) If the protection resource of the predicted protection path does not conflict with that of the actual rerouted recovery path, the source node A directly establishes rerouting cross-connection. (2) If the protection resource of the predicted protection path conflicts with that of the actual rerouted recovery path, the source node A preferentially allocates a resource to the real-time rerouted path for use.

S710. The intermediate node E receives, from the source node A, information that the link segment B-C fails, and performs service switching at the node.

After receiving the information that the link segment B-C fails, that is, after receiving an RSVP Path/Resv message, the intermediate node E determines whether the real-time rerouted resource conflicts with the resource of the predicted protection path.

When resources are not enough, if the real-time rerouted cross-channel resource conflicts with the channel resource of the predicted protection path, the real-time rerouted resource can preempt the channel resource of the predicted protection path. If the channel resource of the predicted protection path is the same as the real-time rerouted channel resource, the resource of the predicted protection path is directly shared, and a cross-service attribute is updated. For the sink node D, a cross-resource processing procedure is consistent with those for the node A and the node E.

S711. After a monitoring time window of the predicted protection path reaches, the source node A enables resource deletion of the predicted protection path A-B-C-E-D.

When the resource of the predicted protection path is deleted, if the resource is occupied by a current service, only service attributes that identify the path as a "predicted protection path" and that are stored in the nodes are deleted, without a need to actually delete a cross-connection.

When a non-predicted point actually fails, and a predicted point is inconsistent with the actual failure point, a predicted protection path of the service is unavailable. It should be noted that, (1) when resources are enough, if a channel resource of the predicted protection path does not conflict with a real-time rerouted channel resource, the procedure proceeds according to an original rerouting control procedure; (2) when resources are not enough, if a channel resource of the predicted protection path is completely consistent with a real-time rerouted channel resource, the real-time rerouted resource is obtained by directly sharing the channel resource of the predicted protection path; or (3) when resources are not enough, if a channel resource of the predicted protection path is not completely consistent with a real-time rerouted channel resource, the real-time rerouted resource can preempt the predicted protection channel resource. Single-station cross-channel resource preemption control processing is performed based on a resource priority policy of the service, that is, for the service, a requirement priority of the real-time rerouted resource is higher than a requirement priority of the resource of the predicted protection path.

Figure 8:
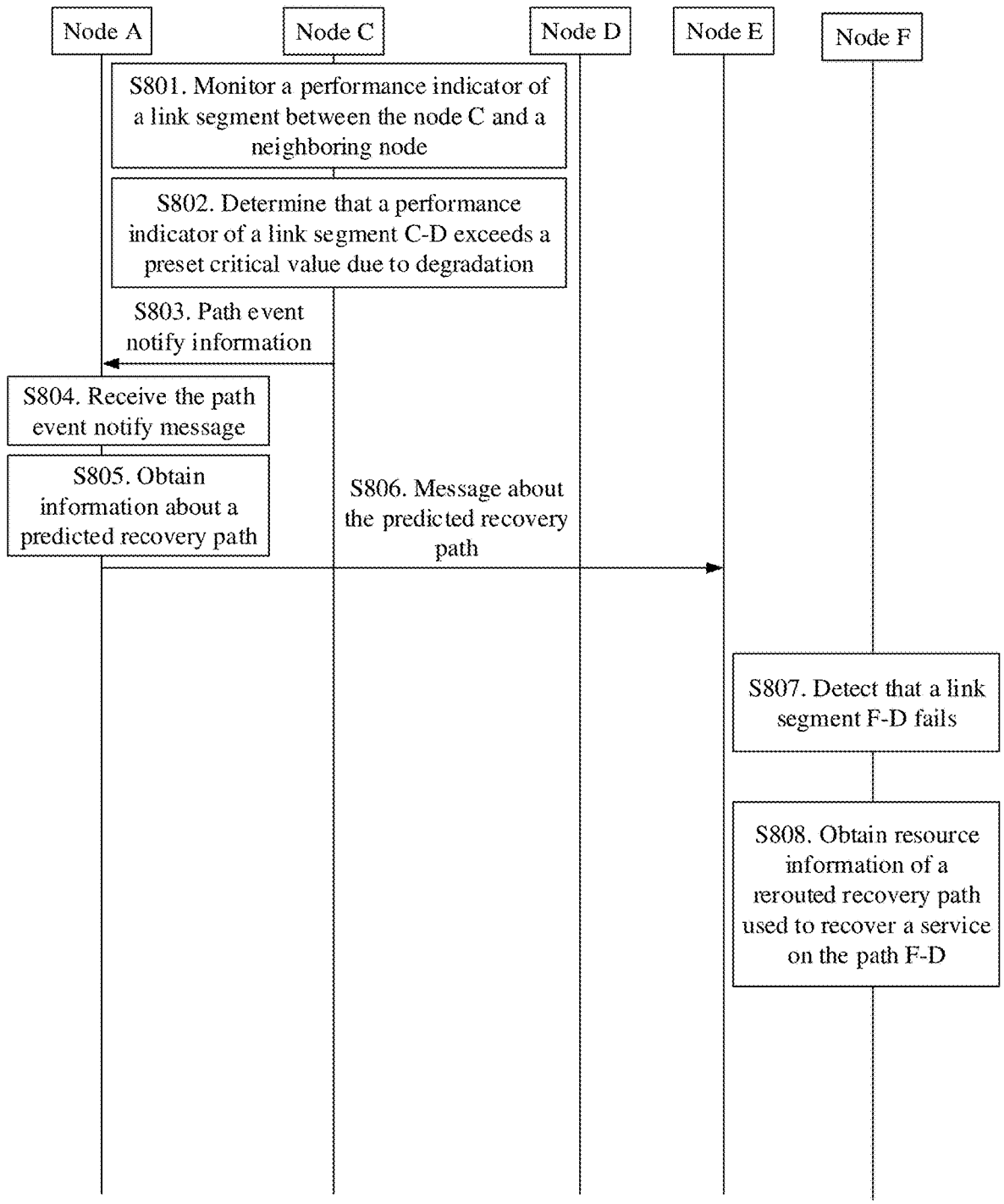
FIG. 8 is a schematic flowchart 4 of a path protection method according to an embodiment of this application.

FIG. 8 is a schematic flowchart 4 of a path protection method according to an embodiment of this application. The architecture of the network system in FIG. 4 is also applicable to the path protection method shown in FIG. 8. Herein, a service path A-B-C-D is used as an example to describe a path protection method in which a predicted failed link segment does not fail, another link segment on the same service path A-B-C-D actually fails, and a resource occupied by the actual failed link segment conflicts with that of a predicted protection path.

With reference to FIG. 4 and FIG. 8, the service path A-B-C-D is used as an example to describe the following specific path protection procedure:

For specific details of S801 to S806, refer to S501 to S506. A difference is that the established predicted protection path is A-B-C-E-D (instead of A-E-D), and an original working path is A-B-C-D. For the predicted failure on the link segment C-D in the path A-B-C-D, an end-to-end predicted protection path A-E-D may be computed, or a part of link segments in A-B-C-D may be shared. A link segment from a branch node to a sink node is determined, where the branch node is a node between the source node A and a node that is on the failed link segment and that is close to the source node A (including the node close to the source node A). For example, in A-B-C-E-D, the node C is a branch node.

The following starts description from S807.

S807. The node F detects that a link segment F-D fails.

In this case, a fiber cut failure occurs on the link segment F-D, the actual failed link segment F-D is different from the link segment C-D predicted to fail, and the source node F finds an affected service F-D based on the failure.

S808. The node F obtains resource information of a rerouted recovery path used to recover the service on the path F-D, where a resource of the rerouted recovery path preempts the resource of the predicted protection path A-B-C-E-D.

The node F determines that there is no predicted protection path for the failure on the link segment F-D, and therefore initiates a real-time rerouting process. The node F computes the resource of the real-time rerouted recovery path based on network-wide resources. Real-time rerouting for the occurred failure can preempt the resource of the predicted protection path prepared for the failure predicted to occur. Herein, the rerouted recovery path may be F-C-E-D. Herein, the resource of the rerouted recovery path may be alternatively computed in advance based on the network-wide resources, and higher efficiency is achieved through advance computation.

The node F is used as a source node, and D is used as a sink node. A Path State message is created by using RSVP-TE. A procedure and protocol packet content are consistent with those in the foregoing embodiment. The Path State message carries an actual-failure type, and also carries a high service priority. Procedures performed by the node F and the node C are the same as existing procedures in single-station cross-configuration processing of real-time rerouting. The intermediate node E determines whether the resource of the real-time service rerouted recovery path conflicts with the resource of the predicted protection path. (1) If the resource of the real-time service rerouted recovery path does not conflict with the resource of the predicted protection path, the intermediate node E directly establishes real-time rerouting cross-connection for the service on the path F-D. (2) If the resource of the real-time service rerouted recovery path conflicts with the resource of the predicted protection path, the intermediate node E occupies, for the real-time rerouted resource of the service on the path F-D, the resource of the predicted protection path for the link segment C-D based on different inter-service policies or priorities.

When a non-predicted point actually fails, a predicted point is inconsistent with the actual failure point, and a resource of a predicted protection path of the service conflicts with service rerouting for the current actual failure, it should be noted that, (1) when the resource of the predicted protection path of the service does not conflict with a rerouted resource of another service, a real-time rerouting procedure of the another service is consistent with that in an original manner; (2) when the resource of the predicted protection path of the service conflicts with a rerouted resource of another service, during establishment of a real-time rerouted recovery path for the another service, a resource needs to be properly selected for occupation based on an inter-service policy (such as an inter-service priority). When the real-time rerouted service recovery path is established, service priority processing can be performed. That is, by using an inter-service priority policy, inter-service resource preemption utilization between rerouting and predicted protection routing can be properly performed, to fully use maximum value of resources, and ensure survivability of a high-priority service.

Figure 9A:
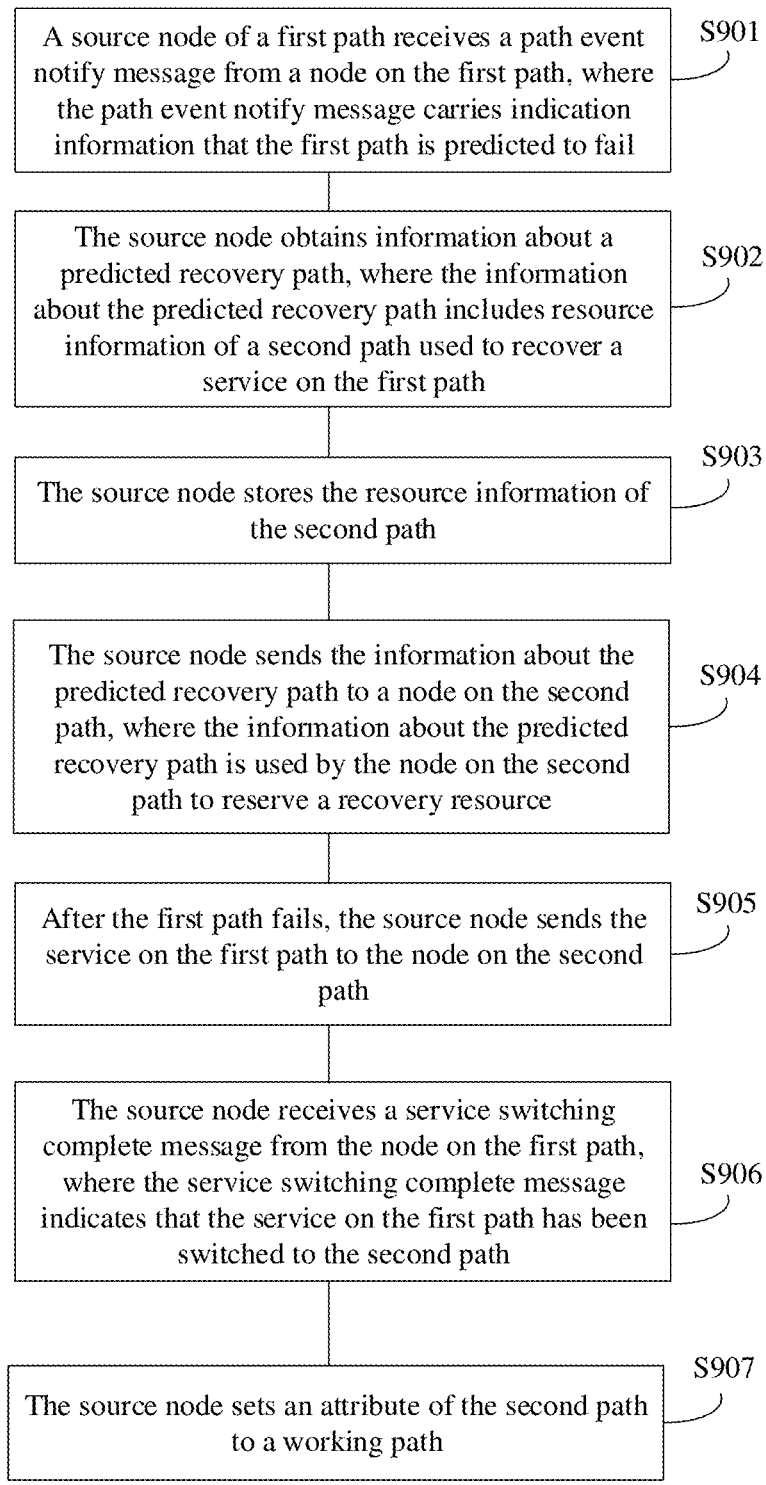
FIG. 9A is a schematic flowchart 5 of a path protection method according to an embodiment of this application.

FIG. 9A is a schematic flowchart 5 of a path protection method according to an embodiment of this application. Herein, a source node of a first path may correspond to the node A in FIG. 4 and FIG. 5A, and the first path corresponds to the service path A-B-C-D in FIG. 4 and FIG. 5A. The method includes the following steps.

S901. The source node of the first path receives a path event notify message from a node on the first path, where the path event notify message carries indication information that the first path is predicted to fail.

Herein, the node A receives the path event notify message from a node C. The path event notify message may include a path failure type field, the path failure type field is set to carry path failure type indication information that the first path is predicted to fail, and the path failure type field may be set to a preset value to indicate that a failure type is a predicted failure.

S902. The source node obtains information about a predicted protection path, where the information about the predicted protection path includes resource information of a second path used to protect a service on the first path, and the first path and the second path include the same source node and a same sink node.

After determining that there is a predicted failure, the source node A computes an end-to-end predicted protection path A-E-D, including slot/wavelength information corresponding to the predicted protection path.

S903. The source node stores the resource information of the second path.

The node A stores resource information of the service path A-E-D.

S904. The source node sends the information about the predicted protection path to a node on the second path, where the information about the predicted protection path is used by the node on the second path to reserve a protection resource.

The node A sends information about the predicted protection path to a node E, where the information about the predicted protection path includes the resource information of A-E-D; and the node E determines information about a resource that needs to be reserved to protect a service on the path A-B-C-D.

S905. After the first path fails, the source node sends the service on the first path to the node on the second path.

The source node A determines that the service on the path A-B-C-D fails within predicted time, and the source node A sends the service on the path A-B-C-D to the other nodes on the path A-E-D.

S906. The source node receives a service switching complete message from the node on the first path, where the service switching complete message indicates that the service on the first path has been switched to the second path.

The source node A receives service switching complete messages from the other nodes on A-B-C-D, where the service switching complete messages indicate that the service on the path A-B-C-D has been switched to A-E-D.

S907. The source node sets an attribute of the second path to a working path.

The source node A sets an attribute of the path A-E-D to a working path.

Optionally, the path event notify message may further include information about a predicted time window, and the information about the predicted time window indicates that the node on the first path is to fail in the predicted time window. After determining that the service on the first path does not fail in the predicted time window, the source node sends a resource release message to the node on the second path. The node on the second path reserves the resource used to protect the service on the first path, and the resource release message is used to indicate the node on the second path to release the reserved resource.

According to the path protection method in this embodiment of this application, a failure is predicted and a protection resource is temporarily reserved, without a need to initiate, after a failure occurs, signaling in real time for rerouting, so that service switching time required after an actual failure occurs can be shortened.

Figure 9B:
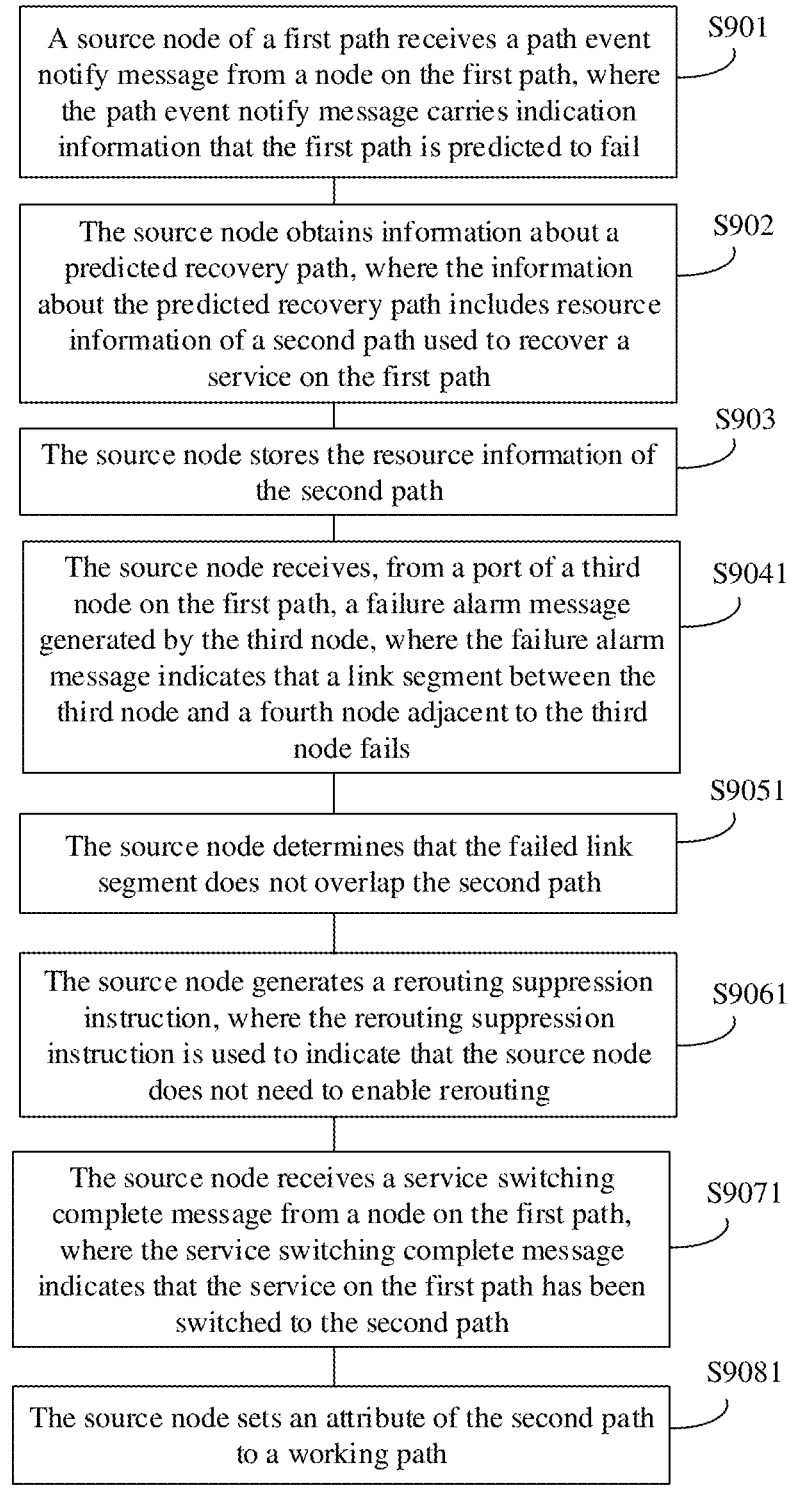
FIG. 9B is a schematic flowchart 6 of a path protection method according to an embodiment of this application.

FIG. 9B is a schematic flowchart 6 of a path protection method according to an embodiment of this application. Steps S901 to S903 in FIG. 9B are the same as steps S901 to S903 in FIG. 9A. Herein, a source node of a first path may correspond to the node A in FIG. 4 and FIG. 6, and the first path corresponds to the service path A-B-C-D in FIG. 4 and FIG. 6. Herein, the path event notify message is received from a port of a first node (node C) on the first path, a failure predict message is generated by the first node, and the failure predict message indicates that a link segment between the first node and a second node (node D) adjacent to the first node is to fail. The method further includes the following steps.

S9041. The source node receives, from a port of a third node on the first path, a failure alarm message generated by the third node, where the failure alarm message indicates that a link segment between the third node and a fourth node adjacent to the third node fails, and the fourth node is located on the first path.

The source node A receives, from a port of a node B on the path A-B-C-D, a failure alarm message generated by the node B, where the failure alarm message indicates that a link segment B-C fails.

S9051. The source node determines that the failed link segment does not overlap the second path.

Herein, the source node A determines that the failed link segment does not overlap the predicted protection path A-E-D.

S9061. The source node generates a rerouting suppression instruction, where the rerouting suppression instruction is used to indicate that the source node does not need to enable rerouting.

The source node A generates a rerouting suppression instruction, where the rerouting suppression instruction is used to indicate that the source node A does not need to enable rerouting.

S9071. The source node receives a service switching complete message from a node on the first path, where the service switching complete message indicates that the service on the first path has been switched to the second path.

The source node A receives service switching complete messages from the other nodes on the path A-B-C-D, where the service switching complete messages indicate that the service on the path A-B-C-D has been switched to the path A-E-D.

S9081. The source node sets an attribute of the second path to a working path.

Herein, the source node A sets an attribute of A-E-D to a working path.

Figure 9C:
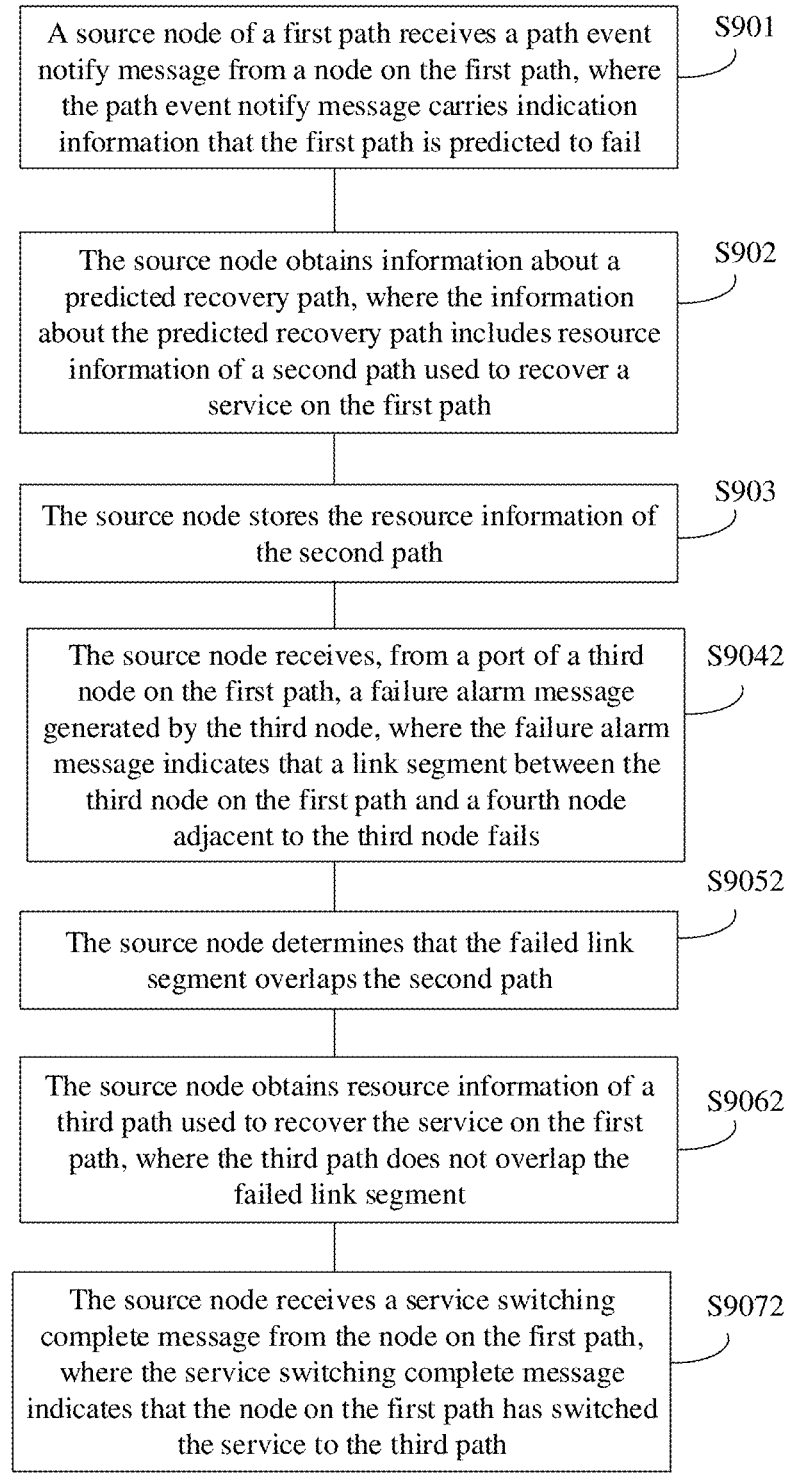
FIG. 9C is a schematic flowchart 7 of a path protection method according to an embodiment of this application.

FIG. 9C is a schematic flowchart 7 of a path protection method according to an embodiment of this application. Steps S901 to S903 in FIG. 9C are the same as those in FIG. 9A. Herein, a source node of a first path may correspond to the node A in FIG. 4 and FIG. 7, the first path corresponds to the service path A-B-C-D in FIG. 4 and FIG. 7, and an established predicted protection path is A-B-C-E-D. Herein, the path event notify message is received from a port of a first node (node C) on the first path, a failure predict message is generated by the first node, and the failure predict message indicates that a link segment between the first node and a second node (node D) adjacent to the first node is to fail. The method further includes the following steps.

S9042. The source node receives, from a port of a third node on the first path, a failure alarm message generated by the third node, where the failure alarm message indicates that a link segment between the third node on the first path and a fourth node adjacent to the third node fails, and the fourth node is located on the first path.

The source node A receives, from a port of a node B on the path A-B-C-D, a failure alarm message generated by the node B, where the failure alarm message indicates that a link segment B-C fails.

S9052. The source node determines that the failed link segment overlaps the second path.

The source node A determines that the failed link segment B-C overlaps A-B-C-E-D, and enables rerouting.

S9062. The source node obtains resource information of a third path used to recover the service on the first path, where the third path does not overlap the failed link segment.

After determining that the failed link segment B-C overlaps A-B-C-E-D, the source node A computes a new rerouted recovery path A-E-D.

S9072. The source node receives a service switching complete message from the node on the first path, where the service switching complete message indicates that the node on the first path has switched the service to the third path.

The source node A receives service switching complete messages from the other nodes on A-B-C-D, where the service switching complete messages indicate that the service on the path A-B-C-D has been switched to A-E-D.

Optionally, the failed link segment and the link segment that is indicated by the failure predict message and that is predicted to fail respectively correspond to priority information, and a priority of the failed link segment is higher than a priority of the link segment predicted to fail; and when a resource that needs to be occupied by the third path overlaps a resource that needs to be occupied by the second path, the overlapping resource is used to establish the third path.

Figure 10:
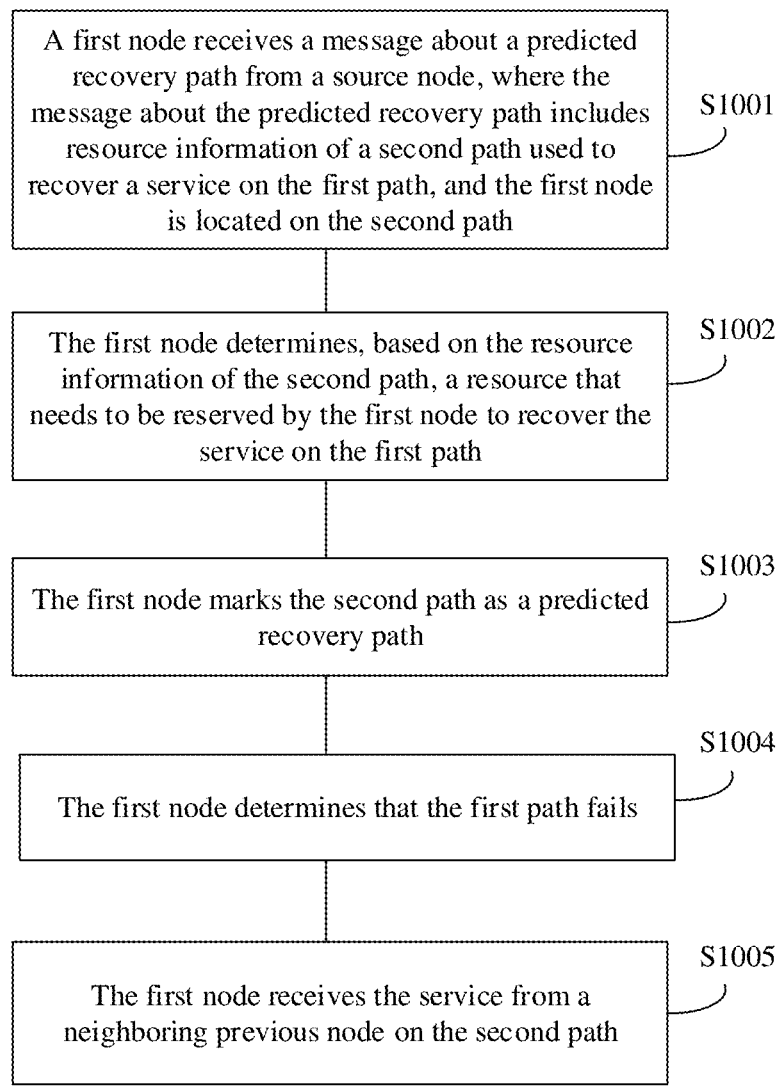
FIG. 10 is a schematic flowchart 8 of a path protection method according to an embodiment of this application.

FIG. 10 is a schematic flowchart 8 of a path protection method according to an embodiment of this application. Herein, a source node of a first path may correspond to the node A in FIG. 4 and FIG. 5A, the first path corresponds to the service path A-B-C-D in FIG. 4 and FIG. 5A, and a first node corresponds to the node E in FIG. 4 and FIG. 5A. The method includes the following steps.

S1001. The first node receives information about a predicted protection path from the source node, where the information about the predicted protection path includes resource information of a second path used to protect a service on the first path, and the first node is located on the second path.

Herein, the first node may further receive a path event notify message from the source node, where the path event notify message carries indication information that the first path is predicted to fail. The first node may receive the path event notify message from the source node, where the path event notify message carries the indication information that the first path is predicted to fail; and the first node may mark the second path as a predicted protection path.

Specifically, the intermediate node E receives information about a predicted protection path from the source node A, where the information about the predicted protection path includes resource information of A-E-D.

S1002. The first node determines, based on the resource information of the second path, a resource that needs to be reserved by the first node to protect the service on the first path.

The node E determines information about a resource that needs to be reserved to protect a service on the path A-B-C-D.

S1003. The first node marks the second path as a predicted protection path.

The node E marks the path A-E-D as a predicted protection path.

S1004. The first node determines that the first path fails.

The node E determines that A-B-C-D fails.

S1005. The first node receives the service from a neighboring previous node on the second path.

The node E receives the service from the node A.

Actually, the first path may not fail within a period of time, and a waste of resource is caused if the resource reserved by the first node to protect the service on the first path is not applicable for long time. Therefore, a monitoring time window of the predicted protection path may be set. If the first node determines that the first node receives no service from the neighboring previous node on the second path in the monitoring time window, it indicates that the first path does not fail in the time window, and the first node can release the resource that is of the node and that is used to protect the service on the first path.

Figure 11:
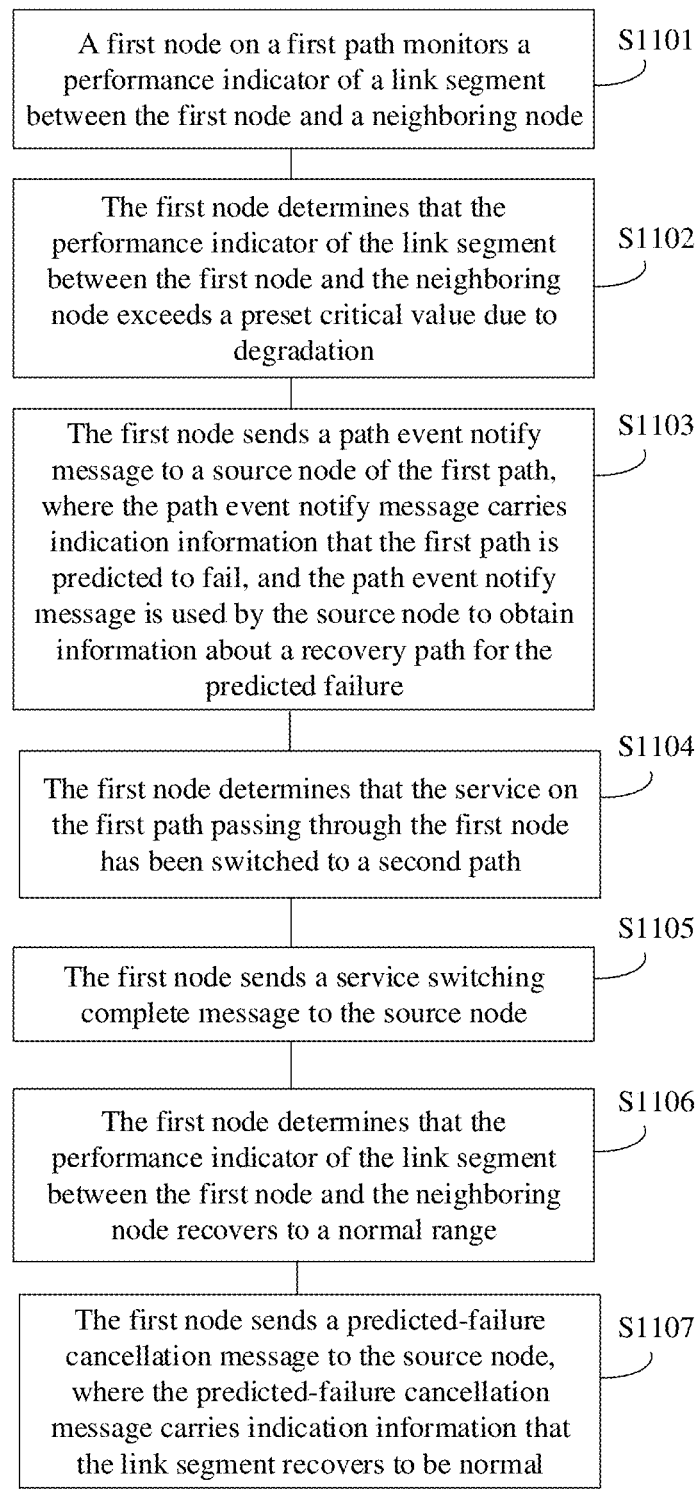
FIG. 11 is a schematic flowchart 9 of a path protection method according to an embodiment of this application.

FIG. 11 is a schematic flowchart 9 of a path protection method according to an embodiment of this application. Herein, a source node of a first path may correspond to the node A in FIG. 4 and FIG. 5A, the first path corresponds to the service path A-B-C-D in FIG. 4 and FIG. 5A, a first node corresponds to the node C in FIG. 4 and FIG. 5A, and a second path corresponds to a service path A-E-D in FIG. 4 and FIG. 5A. The method includes the following steps.

S1101. The first node on the first path monitors a performance indicator of a link segment between the first node and a neighboring node.

The node C enables an FFP predict function, and the node C detects a link status of a link segment C-D by collecting a millisecond-order optical performance indicator (such as a SOP/a BER/optical power).

S1102. The first node determines that the performance indicator of the link segment between the first node and the neighboring node exceeds a preset critical value due to degradation.

The node C may perform modeling by using an AI classification model, to predict and perceive an OCH fiber failure on the link segment C-D, and generate an OTU port predict alarm.

S1103. The first node sends a path event notify message to the source node of the first path, where the path event notify message carries indication information that the first path is predicted to fail, the path event notify message is used by the source node to obtain information about a protection path for the predicted failure, the information about the predicted protection path includes resource information of the second path used to protect a service on the first path, and the first path and the second path include the same source node and a same sink node.

The node C sends path event notify information to the source node A, where the path event notify message carries indication information that the path is to fail.

The path event notify message may include a path failure type field, and the path failure type field is set to carry path failure type indication information that the first path is predicted to fail.

S1104. The first node determines that the service on the first path passing through the first node has been switched to the second path.

Service switching is performed after the link segment C-D actually fails, and the node C determines that a service on A-B-C-D has been switched to A-E-D.

S1105. The first node sends a service switching complete message to the source node.

The node C sends a service switching complete message to the source node A.

S1106. The first node determines that the performance indicator of the link segment between the first node and the neighboring node recovers to a normal range.

Optionally, if determining that the performance indicator of the link segment C-D recovers to a normal range, the node C may notify the source node A that the performance indicator of the link segment C-D recovers to the normal range.

S1107. The first node sends a predicted-failure cancellation message to the source node, where the predicted-failure cancellation message carries indication information that the link segment recovers to be normal.

Optionally, the node C sends a predicted-failure cancellation message to the source node A, where the predicted-failure cancellation message carries indication information that the link segment C-D recovers to be normal.

Figure 12:
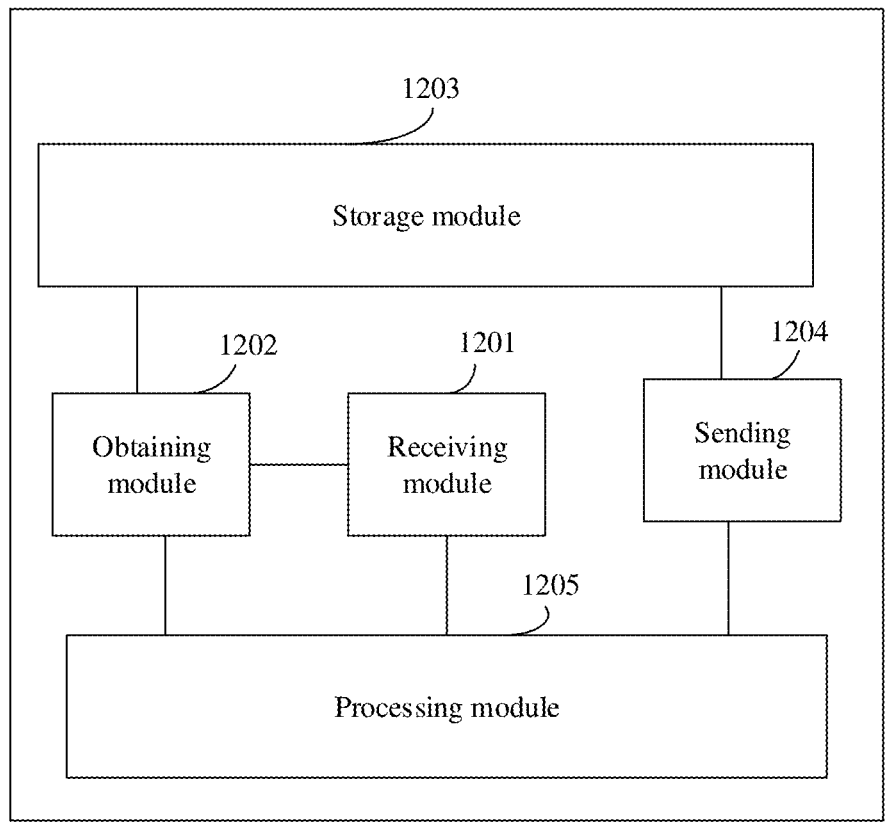
FIG. 12 is a schematic diagram 1 of a structure of a network node according to an embodiment of this application.

FIG. 12 is a schematic diagram 1 of a structure of a network node according to an embodiment of this application. The network node includes a receiving module 1201, an obtaining module 1202, and a storage module 1203. The network node corresponds to the source node in the foregoing manner embodiments.

The receiving module 1201 is configured to receive a path event notify message from a node on the first path, where the path event notify message carries indication information that the first path is predicted to fail.

The obtaining module 1202 is configured to obtain information about a predicted protection path, where the information about the predicted protection path includes resource information of a second path used to protect a service on the first path, and the first path and the second path include the same source node and a same sink node.

The storage module 1203 is configured to store the resource information of the second path.

According to the network node in this embodiment of this application, a failure is predicted and a protection resource is temporarily reserved, without a need to initiate, after a failure occurs, signaling in real time for rerouting, so that service switching time required after an actual failure occurs can be shortened.

Optionally, the network node may further include a sending module 1204 and a processing module 1205.

The sending module 1204 is configured to: send the information about the predicted protection path to a node on the second path, where the information about the predicted protection path is used by the node on the second path to reserve a protection resource; and after the first path fails, send the service on the first path to the node on the second path.

The receiving module 1201 is further configured to:

receive a service switching complete message from the node on the first path, where the service switching complete message indicates that the service on the first path has been switched to the second path.

The processing module 1205 is configured to set an attribute of the second path to a working path.

Optionally, the path event notify message further includes information about a predicted time window, and the information about the predicted time window indicates that the node on the first path is to fail in the predicted time window; and the network node includes a sending module 1204 and a processing module 1205.

The processing module 1205 is configured to determine that the service on the first path does not fail in the predicted time window.

The sending module 1204 is further configured to send a resource release message to a node on the second path, where the node on the second path reserves a resource used to protect the service on the first path, and the resource release message is used to indicate the node on the second path to release the reserved resource.

Optionally, the path event notify message is received by the receiving module 1201 from a port of a first node on the first path, a failure predict message is generated by the first node, and the failure predict message indicates that a link segment between the first node and a second node adjacent to the first node is to fail; and the network node includes a processing module 1205.

The receiving module 1201 is further configured to receive, from a port of a third node on the first path, a failure alarm message generated by the third node, where the failure alarm message indicates that a link segment between the third node and a fourth node adjacent to the third node fails, and the fourth node is located on the first path.

The processing module 1205 is configured to: determine that the failed link segment does not overlap the second path; and generate a rerouting suppression instruction, where the rerouting suppression instruction is used to indicate that the source node does not need to enable rerouting.

The receiving module 1201 is further configured to receive a service switching complete message from the node on the first path, where the service switching complete message indicates that the service on the first path has been switched to the second path.

The processing module 1205 is further configured to set an attribute of the second path to a working path.

Optionally, the path event notify message is received by the receiving module from a port of a first node on the first path, a failure predict message is generated by the first node, and the failure predict message indicates that a link segment between the first node and a second node adjacent to the first node is to fail; and the network node includes a processing module 1205.

The receiving module 1201 is further configured to receive, from a port of a third node on the first path, a failure alarm message generated by the third node, where the failure alarm message indicates that a link segment between the third node on the first path and a fourth node adjacent to the third node fails, and the fourth node is located on the first path.

The processing module 1205 is configured to determine that the failed link segment overlaps the second path.

The obtaining module 1202 is further configured to obtain resource information of a third path used to recover the service on the first path, where the third path does not overlap the failed link segment.

The receiving module 1201 is further configured to receive a service switching complete message from the node on the first path, where the service switching complete message indicates that the node on the first path has switched the service to the third path.

Herein, the receiving module 1201 may be a receiver, the sending module 1204 may be a transmitter, and the receiving module 1201 and the sending module 1204 may be an integrated transceiver. The obtaining module 1202 may be a processor. The processing module 1205 may be a processor independent of the obtaining module 1202, or may be a processor integrated with the obtaining module 1202. The storage module 1203 may be a memory.

Figure 13:
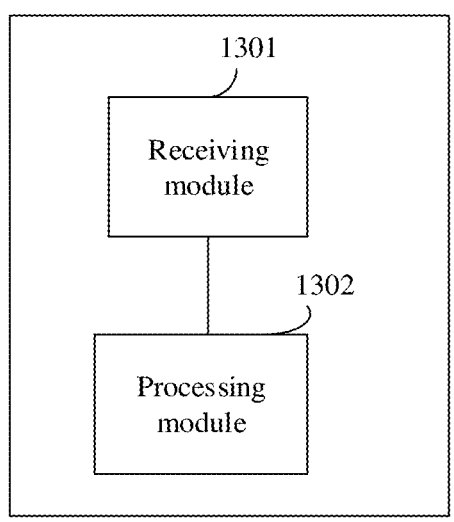
FIG. 13 is a schematic diagram 2 of a structure of a network node according to an embodiment of this application.

FIG. 13 is a schematic diagram 2 of a structure of a network node according to an embodiment of this application. The network node includes a receiving module 1301 and a processing module 1302. The network node corresponds to the intermediate node on the predicted protection path in the foregoing method embodiments, for example, the node E in FIG. 5A.

The receiving module 1301 is configured to receive information about a predicted protection path, where the information about the predicted protection path includes resource information of a second path used to protect a service on a first path.

The processing module 1302 is configured to: determine, based on the resource information of the second path, a resource that needs to be reserved by the network node to protect the service on the first path; and mark the second path as a predicted protection path.

Optionally, the receiving module 1301 is further configured to receive a path event notify message from the source node, where the path event notify message carries indication information that the first path is predicted to fail.

Optionally, the processing module 1302 is further configured to mark the second path as a predicted protection path.

Optionally, the processing module 1302 is further configured to determine that the first path fails.

The receiving module 1301 is further configured to receive the service from a neighboring previous node on the second path.

Herein, the receiving module 1301 may be a receiver, and the processing module 1302 may be a processor.

Figure 14:
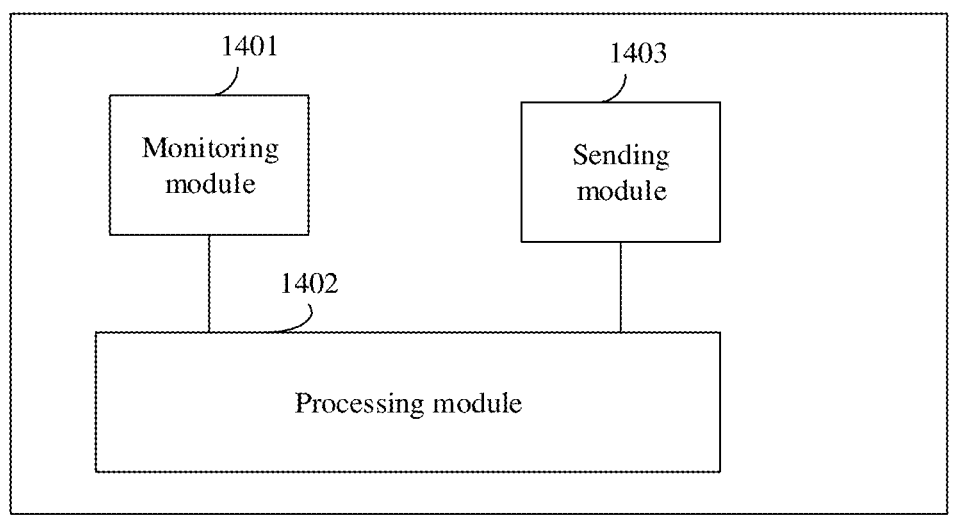
FIG. 14 is a schematic diagram 3 of a structure of a network node according to an embodiment of this application.

FIG. 14 is a schematic diagram 3 of a structure of a network node according to an embodiment of this application. The network node corresponds to the intermediate node on the predicted protection path in the foregoing method embodiments and the node that monitors the performance indicator of the link segment between the node and the neighboring node in the foregoing method embodiments, for example, the node C in FIG. 5A. The network node includes a monitoring module 1401, a processing module 1402, and a sending module 1403.

The monitoring module 1401 is configured to monitor a performance indicator of a link segment between the network node and a neighboring node on the first path.

The processing module 1402 is configured to determine that the performance indicator of the link segment between the network node and the neighboring node exceeds a preset critical value due to degradation.

The sending module 1403 is configured to send a path event notify message to a source node of the first path, where the path event notify message carries indication information that the first path is predicted to fail, the path event notify message is used by the source node to obtain information about a protection path for the predicted failure, the information about the predicted protection path includes resource information of a second path used to protect a service on the first path, and the first path and the second path include the same source node and a same sink node.

Optionally, the processing module 1402 is further configured to determine that the performance indicator of the link segment between the network node and the neighboring node recovers to a normal range.

The sending module 1403 is further configured to send a predicted-failure cancellation message to the source node, where the predicted-failure cancellation message carries indication information that the link segment recovers to be normal.

Herein, the monitoring module 1401 may be a light sensor, the processing module 1402 may be a processor, and the sending module 1403 may be a transmitter or a transceiver.

Figure 15:
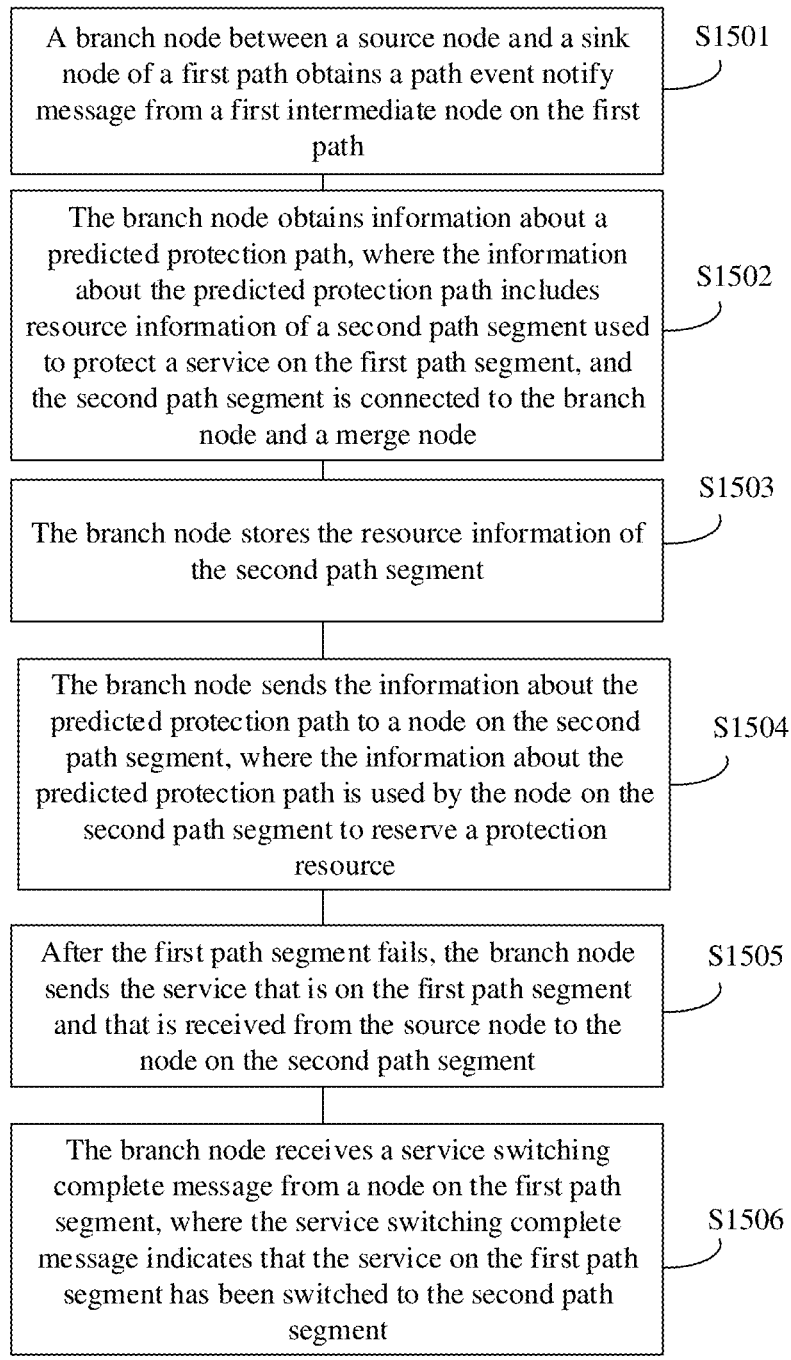
FIG. 15 is a schematic flowchart 10 of a path protection method according to an embodiment of this application.

FIG. 15 is a schematic flowchart 10 of a path protection method according to an embodiment of this application. Herein, a source node of a first path may correspond to the node A in FIG. 4, a sink node of the first path may correspond to the node D in FIG. 4, and the first path corresponds to a service path A-B-C-D in FIG. 4. The method includes the following steps.

S1501. A branch node between the source node and the sink node of the first path obtains a path event notify message from a first intermediate node on the first path, where the first intermediate node and the branch node are a same node or the first intermediate node is located between the branch node and a merge node, and the path event notify message carries indication information that a first path segment between the branch node and the merge node is predicted to fail.

As shown in FIG. 4, the branch node is the node C, and the merge node is the node D. The link event notify message may include a link failure type field, and the link failure type field is set to carry link failure type indication information that the first link is predicted to fail. The merge node herein is a merge node closest to the branch node in a plurality of merge nodes between the branch node and the sink node.

Certainly, if there is only one unique merge node between the branch node and the sink node, the merge node herein is the unique merge node.

S1502. The branch node obtains information about a predicted protection path, where the information about the predicted protection path includes resource information of a second path segment used to protect a service on the first path segment, and the second path segment is connected to the branch node and the merge node.

Different from the case in which the source node A obtains the information about the predicted protection path through computation or from another node (for example, a network management system) in the foregoing embodiment. Herein, the node C may obtain the information about the predicted protection path, and the node C obtains resource information of a second path segment used to protect a service on a path segment C-D. Herein, the second path segment is C-E-D.

S1503. The branch node stores the resource information of the second path segment.

The node C stores resource information of the second path segment C-E-D.

S1504. The branch node sends the information about the predicted protection path to a node on the second path segment, where the information about the predicted protection path is used by the node on the second path segment to reserve a protection resource.

The node C sends the information about the predicted protection path to a node E, where the information about the predicted protection path includes the resource information of C-E-D; and the node E determines information about a resource that needs to be reserved to protect the service on the path segment C-D.

S1505. After the first path segment fails, the branch node sends the service that is on the first path segment and that is received from the source node to the node on the second path segment.

The node C determines that the service on the path segment C-D fails within predicted time, and the node C sends the service on the path segment C-D the other nodes on C-E-D.

S1506. The branch node receives a service switching complete message from a node on the first path segment, where the service switching complete message indicates that the service on the first path segment has been switched to the second path segment.

The node C receives a service switching complete message from the other node, namely, the node D, on C-D, where the service switching complete message indicates that the service on the path segment C-D has been switched to C-E-D.

The path event notify message in this embodiment of this application further includes information about a predicted time window, and the information about the predicted time window indicates that a node on the first path segment is to fail in the predicted time window. After determining that the service on the first path segment does not fail in the predicted time window, the branch node may send a resource release message to the node on the second path segment. The node on the second path segment reserves the resource used to protect the service on the first path segment, and the resource release message is used to indicate the node on the second path segment to release the reserved resource.

Optionally, the path event notify message is obtained from a port of the first intermediate node on the first path segment, a failure predict message is generated by the first intermediate node, and the failure predict message indicates that a link segment between the first intermediate node and a second intermediate node that is located on the first link and that is adjacent to the first intermediate node is to fail; and the method further includes: the branch node receives, from a port of a third intermediate node on the first path segment, a failure alarm message generated by the third intermediate node, where the failure alarm message indicates that a link segment between the third intermediate node and a fourth intermediate node adjacent to the third node fails, and the fourth intermediate node is located on the first path segment; the branch node determines that the failed link segment does not overlap the second path segment; and the branch node receives a service switching complete message from a node on the first path segment, where the service switching complete message indicates that the service on the first path segment has been switched to the second path segment. For specific details, refer to the case in which the predicted failure is different from the actually occurred failure in the foregoing embodiment. A difference is that in the foregoing embodiment, the source node obtains the information about the predicted protection path through computation or from another node (for example, a network management system), and herein, the branch node obtains the information about the predicted protection path.

Figure 16:
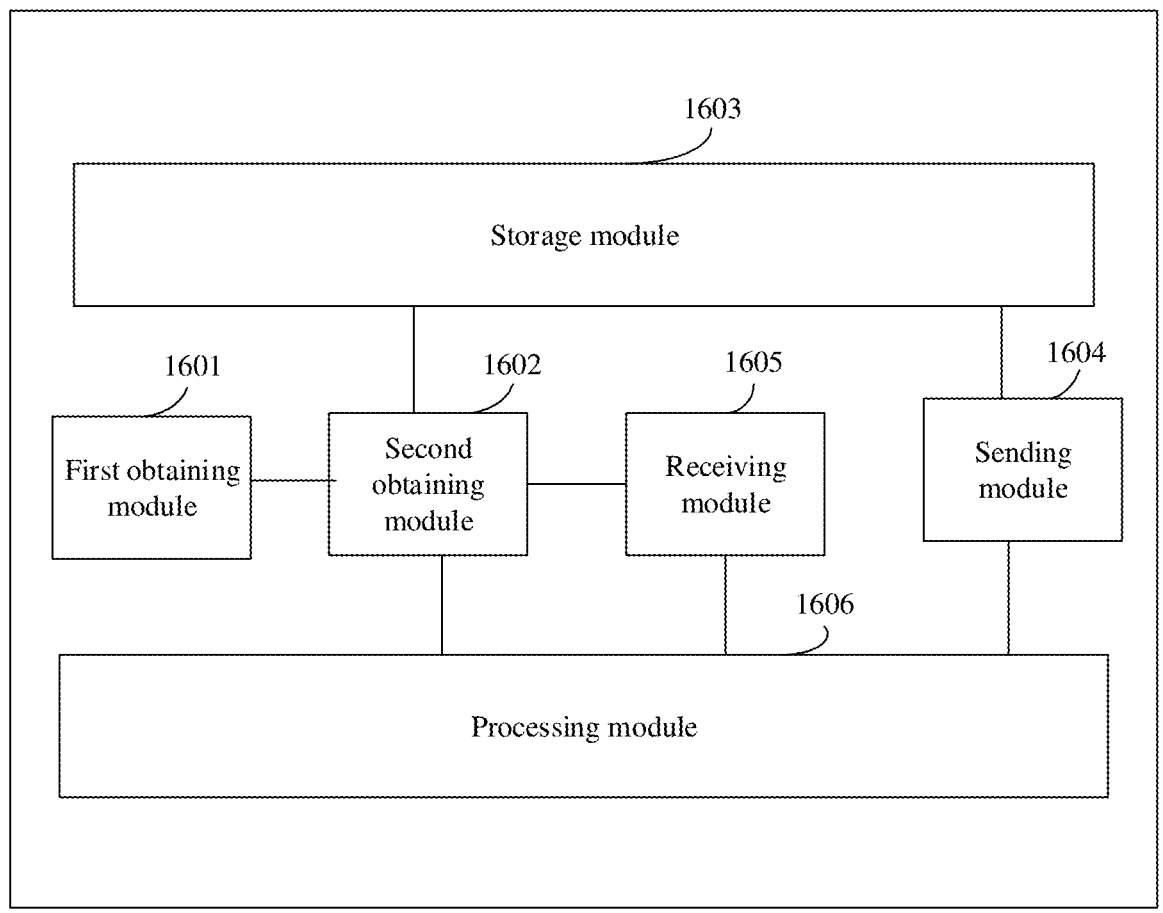
FIG. 16 is a schematic diagram 4 of a structure of a network node according to an embodiment of this application.

FIG. 16 is a schematic diagram 4 of a structure of a network node according to an embodiment of this application. The network node is a branch node between a source node and a sink node of a first path and includes:

a first obtaining module 1601, configured to obtain a path event notify message from a first intermediate node on the first path, where the first intermediate node and the branch node are a same node or the first intermediate node is located between the branch node and a merge node, the merge node is located between the branch node and the sink node, and the path event notify message carries indication information that a first path segment between the branch node and the merge node is predicted to fail; a second obtaining module 1602, configured to obtain information about a predicted protection path, where the information about the predicted protection path includes resource information of a second path segment used to protect a service on the first path segment, and the second path segment is connected to the branch node and the merge node; and a storage module 1603, configured to store the resource information of the second path segment.

Optionally, the merge node is a merge node closest to the branch node in a plurality of merge nodes between the branch node and the sink node.

Optionally, that the path event notify message carries indication information that a first path segment is predicted to fail includes:

the path event notify message includes a path failure type field, and the path failure type field is set to carry path failure type indication information that the first path segment is predicted to fail.

Optionally, the network node further includes a sending module and a receiving module. The sending module 1604 is configured to: send the information about the predicted protection path to a node on the second path segment, where the information about the predicted protection path is used by the node on the second path segment to reserve a protection resource; and after the first path segment fails, send the service that is on the first path segment and that is received from the source node to the node on the second path segment; and the receiving module 1605 is configured to receive a service switching complete message from a node on the first path segment, where the service switching complete message indicates that the service on the first path segment has been switched to the second path segment.

Optionally, the path event notify message further includes information about a predicted time window, and the information about the predicted time window indicates that a node on the first path segment is to fail in the predicted time window; and the network node further includes a processing module 1606. The processing module is configured to determine that the service on the first path segment does not fail in the predicted time window; and the sending module 1604 is further configured to send a resource release message to a node on the second path segment, where the node on the second path segment reserves a resource used to protect the service on the first path segment, and the resource release message is used to indicate the node on the second path segment to release the reserved resource.

Optionally, the path event notify message is obtained from a port of the first intermediate node on the first path segment, a failure predict message is generated by the first intermediate node, and the failure predict message indicates that a link segment between the first intermediate node and a second intermediate node that is located on the first path segment and that is adjacent to the first intermediate node is to fail. The receiving module 1605 is further configured to receive, from a port of a third intermediate node on the first path segment, a failure alarm message generated by the third intermediate node, where the failure alarm message indicates that a link segment between the third intermediate node and a fourth intermediate node adjacent to the third node fails, and the fourth intermediate node is located on the first path segment; the processing module 1606 is further configured to determine that the failed link segment does not overlap the second path segment; and the receiving module 1605 is further configured to receive a service switching complete message from a node on the first path segment, where the service switching complete message indicates that the service on the first path segment has been switched to the second path segment.

A person skilled in the art can understand that the functions described with reference to various illustrative logical blocks, modules, and algorithm steps disclosed and described in this specification can be implemented by hardware, software, firmware, or any combination thereof. If software is used for implementation, the functions described with reference to the illustrative logical blocks, modules, and steps may be stored in or transmitted over a computer-readable medium as one or more instructions or code and executed by a hardware-based processing unit. The computer-readable medium may include a computer-readable storage medium. The computer-readable storage medium corresponds to a tangible medium such as a data storage medium, or a communication medium including any medium that facilitates transfer of a computer program from one place to another place (for example, according to a communication protocol). In this manner, the computer-readable medium may generally correspond to: (1) a non-transitory tangible computer-readable storage medium, or (2) a communication medium, for example, a signal or a carrier. The data storage medium may be any available medium that can be accessed by one or more computers or one or more processors to retrieve instructions, code, and/or data structures for implementing the technologies described in this application. A computer program product may include a computer-readable medium.

By way of example and not limitation, such type of computer-readable storage media may include a RAM, a ROM, an EEPROM, a CD-ROM or another optical disc storage apparatus, a magnetic disk storage apparatus or another magnetic storage apparatus, a flash memory, or any other medium that can store required program code in a form of instructions or a data structure and can be accessed by a computer. In addition, any connection is appropriately referred to as a computer-readable medium. For example, if instructions are transmitted from a website, a server, or another remote source through a coaxial cable, an optical fiber, a twisted pair, a digital subscriber line (DSL), or wireless technologies such as infrared, radio, and microwave, the coaxial cable, the optical fiber, the twisted pair, the DSL, or the wireless technologies such as infrared, radio, and microwave are included in a definition of the medium. However, it should be understood that the computer-readable storage medium and the data storage medium may not include a connection, a carrier, a signal, or another transitory medium, but actually mean non-transitory tangible storage media. Disks and optical discs used in this specification include a compact disc (CD), a laser disc, an optical disc, a digital versatile disc (DVD), and a Blu-ray disc. The disks generally magnetically reproduce data, whereas the optical discs optically reproduce data with lasers. Combinations of the foregoing objects should also be included in the scope of the computer-readable medium.

Instructions may be executed by one or more processors such as one or more digital signal processors (DSP), a general-purpose microprocessor, an application-specific integrated circuit (ASIC), a field programmable gate array (FPGA), or an equivalent integrated or discrete logic circuit. Therefore, the term "processor" used in this specification may refer to the foregoing structure, or any other structure suitable for implementation of the technologies described in this specification. In addition, in some aspects, the functions described with reference to the illustrative logical blocks, modules, and steps described in this specification may be provided within dedicated hardware and/or software modules configured for encoding and decoding, or may be incorporated into a concatenated codec. In addition, the technologies may be all implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by using different hardware units. Actually, as described above, various units may be combined into a codec hardware unit in combination with appropriate software and/or firmware, or may be provided by interoperable hardware units (including the one or more processors described above).

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A path protection method, comprising:
receiving, by a source node of a first path, a path event notify message from a first node on the first path, wherein the path event notify message comprises indication information that the first path is predicted to fail;

obtaining, by the source node, information about a predicted protection path, wherein the information about the predicted protection path comprises resource information of a second path useable to protect a service on the first path, and the first path and the second path comprise the source node and a same sink node; and storing, by the source node, the resource information of the second path, wherein the path event notify message is received from a port of the first node on the first path, a failure predict message is generated by the first node, and the failure predict message indicates that a link segment between the first node and a second node, adjacent to the first node, is to fail; and the method further comprises:

receiving, by the source node from a port of a third node on the first path, a failure alarm message generated by the third node, wherein the failure alarm message indicates that a link segment between the third node on the first path and a fourth node, adjacent to the third node, fails, and the fourth node is located on the first path;

determining, by the source node, that the failed link segment between the third node and the fourth node overlaps the second path;

obtaining, by the source node, resource information of a third path useable to recover the service on the first path, wherein the third path fails to overlap the failed link segment between the third node and the fourth node; and receiving, by the source node, a service switching complete message from the first node on the first path, wherein the service switching complete message indicates that the first node on the first path has switched the service to the third path.

2. The method according to claim 1, wherein
the path event notify message further comprises a path failure type field, and the path failure type field comprises path failure type indication information that the first path is predicted to fail.

3. The method according to claim 1, further comprising:
sending, by the source node, the information about the predicted protection path to a second node on the second path, wherein the information about the predicted protection path is useable by the second node on the second path to reserve a protection resource;
after the first path fails, sending, by the source node, the service on the first path to the second node on the second path;
receiving, by the source node, a service switching complete message from the first node on the first path, wherein the service switching complete message indicates that the service on the first path has been switched to the second path; and
setting, by the source node, an attribute of the second path to a working path.

4. The method according to claim 1, wherein the path event notify message further comprises information about a predicted time window, and the information about the predicted time window indicates that the first node on the first path is to fail in the predicted time window; and the method further comprises:
determining, by the source node, that the service on the first path does not fail in the predicted time window; and
sending, by the source node, a resource release message to a second node on the second path, wherein the second node on the second path reserves a resource usable to protect the service on the first path, and the resource release message is usable to indicate to the second node on the second path to release the reserved resource.

5. The method according to claim 1, further comprises:
determining, by the source node, that the failed link segment between the third node and the fourth node fails to overlap the second path;
generating, by the source node, a rerouting suppression instruction, wherein the rerouting suppression instruction is useable to indicate that the source node fails to enable rerouting;
receiving, by the source node, a service switching complete message from the first node on the first path, wherein the service switching complete message indicates that the service on the first path has been switched to the second path; and
setting, by the source node, an attribute of the second path to a working path.

6. The method according to claim 1, wherein
the failed link segment between the third node and the fourth node and the link segment that is indicated by the failure predict message and that is predicted to fail respectively correspond to priority information, and a priority of the failed link segment between the third node and the fourth node is higher than a priority of the link segment that is indicated by the failure predict message and that is predicted to fail; and
an overlapping resource is useable to establish the third path in response to a resource that is to be occupied by the third path overlaps a resource that is to be occupied by the second path.

7. A path protection method, comprising:
sending, by a port of a first node on a first path, a path event notify message to a source node;
generating, by the first node, a failure predict message, and the failure predict message indicates that a link segment between the first node and a second node, adjacent to the first node, is to fail; and
receiving, by a third node, information about a predicted protection path from a source node, wherein the information about the predicted protection path comprises resource information of a second path useable to protect a service on the first path, and the third node is located on the second path;
determining, by the third node based on the resource information of the second path, a resource that is to be reserved by the third node to protect the service on the first path; and
marking, by the third node, the second path as a predicted protection path;
receiving a failure alarm message by the source node from a port of a fourth node on the first path, the failure alarm message indicates that a link segment between the fourth node on the first path and a fifth node, adjacent to the fourth node, fails, and the fifth node is located on the first path;
determining, by the source node, that the failed link segment between the fourth node and the fifth node overlaps the second path, and
obtaining, by the source node, resource information of a third path useable to recover the service on the first path, the third path fails to overlap the failed link segment between the fourth node and the fifth node;
sending, by the first node on the first path, a service switching complete message to the source node, wherein the service switching complete message indicates that the first node on the first path has switched the service to the third path.

8. The path protection method according to claim 7, further comprising:
receiving, by the third node, a path event notify message from the source node, wherein the path event notify message comprises indication information that the first path is predicted to fail.

9. The path protection method according to claim 7, further comprising:
determining, by the third node, that the first path fails; and
receiving, by the third node, the service from a neighboring previous node on the second path.

10. The path protection method according to claim 7, further comprising:
enabling, by the third node, a monitoring time window of the predicted protection path;
determining, by the third node, that the first node fails to receive service from a neighboring previous node on the second path in the monitoring time window; and
releasing, by the third node, the resource that is of the third node and that is useable to protect the service on the first path.

11. A network node, wherein the network node is a source node of a first path and comprises:
a receiver, configured to receive a path event notify message from a first node on the first path, wherein the path event notify message comprises indication information that the first path is predicted to fail;
a processor, configured to obtain information about a predicted protection path, wherein the information about the predicted protection path comprises resource information of a second path useable to protect a service on the first path, and the first path and the second path comprise the source node and a same sink node; and
a non-transitory memory, configured to store the resource information of the second path,
wherein the path event notify message is received by the receiver from a port of the first node on the first path, a failure predict message is generated by the first node, and the failure predict message indicates that a link segment between the first node and a second node, adjacent to the first node, is to fail; wherein
the receiver is further configured to receive, from a port of a third node on the first path, a failure alarm message generated by the third node, wherein the failure alarm message indicates that a link segment between the third node on the first path and a fourth node, adjacent to the third node, fails, and the fourth node is located on the first path;
the processor is configured to determine that the failed link segment between the third node and the fourth node overlaps the second path;
the processor is further configured to obtain resource information of a third path useable to recover the service on the first path, wherein the third path fails to overlap the failed link segment between the third node and the fourth node; and
the receiver is further configured to receive a service switching complete message from the first node on the first path, wherein the service switching complete message indicates that the first node on the first path has switched the service to the third path.

12. The network node according to claim 11, wherein the path event notify message further comprises a path failure type field, and the path failure type field comprises path failure type indication information that the first path is predicted to fail.

13. The network node according to claim 11, further comprising a transmitter, wherein the transmitter is configured to: send the information about the predicted protection path to a second node on the second path, wherein the information about the predicted protection path is useable by the node on the second path to reserve a protection resource; and after the first path fails, send the service on the first path to the second node on the second path;
the receiver is further configured to:
receive a service switching complete message from the first node on the first path, wherein the service switching complete message indicates that the service on the first path has been switched to the second path; and
the processor is configured to set an attribute of the second path to a working path.

14. The network node according to claim 11, wherein the path event notify message further comprises information about a predicted time window, and the information about the predicted time window indicates that the first node on the first path is to fail in the predicted time window; and the network node further comprises a transmitter, wherein
the processor is configured to determine that the service on the first path does not fail in the predicted time window; and
the transmitter is further configured to send a resource release message to a second node on the second path, wherein the second node on the second path reserves a resource useable to protect the service on the first path, and the resource release message is useable to indicate to the second node on the second path to release the reserved resource.

15. The network node according to claim 11,
the processor is configured to: determine that the failed link segment fails to overlap the second path; and generate a rerouting suppression instruction, wherein the rerouting suppression instruction is useable to indicate that the source node fails to enable rerouting;
the receiver is further configured to receive a service switching complete message from the first node on the first path, wherein the service switching complete message indicates that the service on the first path has been switched to the second path; and the processor is further configured to set an attribute of the second path to a working path.

16. A network node, comprising:
a receiver, configured to receive information about a predicted protection path, wherein the information about the predicted protection path comprises resource information of a second path useable to protect a service on a first path, and the network node is located on the second path;
a processor, configured to: determine, based on the resource information of the second path, a resource that is to be reserved by the network node to protect the service on the first path; and
mark the second path as a predicted protection path; wherein
a transmitter in a first node configured to transmit, by a port of the first node on the first path, a path event notify message to a source node;
a processor in the first node is further configured to generate a failure predict message, and the failure predict message indicates that a link segment between the first node and a second node, adjacent to the first node, is to fail; and wherein a failure alarm message is received by the source node from a port of a third node on the first path, the failure alarm message indicates that a link segment between the third node on the first path and a fourth node, adjacent to the third node, fails, and the fourth node is located on the first path;

wherein the source node determines that the failed link segment between the third node and a fourth node overlaps the second path, and wherein the source node obtains resource information of a third path useable to recover the service on the first path, the third path fails to overlap the failed link segment between the third node and a fourth node; and the transmitter is further configured to transmit, by the first node on the first path, a service switching complete message to the source node, wherein the service switching complete message indicates that the first node on the first path has switched the service to the third path.

17. The network node according to claim 16, wherein the receiver is further configured to receive a path event notify message from the source node, wherein the path event notify message comprises indication information that the first path is predicted to fail.

18. The network node according to claim 16, wherein the processor in network node is further configured to determine that the first path fails; and the receiver is further configured to receive the service from a neighboring previous node on the second path.

* * * * *